US012207041B2

(12) United States Patent
Zhou et al.

(10) Patent No.: US 12,207,041 B2
(45) Date of Patent: Jan. 21, 2025

(54) MICROPHONES

(71) Applicant: SHENZHEN SHOKZ CO., LTD., Guangdong (CN)

(72) Inventors: Wenbing Zhou, Shenzhen (CN); Yujia Huang, Shenzhen (CN); Yongshuai Yuan, Shenzhen (CN); Wenjun Deng, Shenzhen (CN); Xin Qi, Shenzhen (CN); Fengyun Liao, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 147 days.

(21) Appl. No.: 17/816,007

(22) Filed: Jul. 29, 2022

(65) Prior Publication Data

US 2023/0045906 A1 Feb. 16, 2023

Related U.S. Application Data

(63) Continuation of application No. PCT/CN2021/112062, filed on Aug. 11, 2021.

(51) Int. Cl.
*H04R 1/22* (2006.01)

(52) U.S. Cl.
CPC .................................... *H04R 1/22* (2013.01)

(58) Field of Classification Search
CPC .. H04R 2201/003; H04R 19/04; H04R 17/02; H04R 1/04; H04R 3/04; H04R 1/222;
(Continued)

(56) References Cited

U.S. PATENT DOCUMENTS 4,949,387 A 8/1990 Andert et al.
5,745,588 A 4/1998 Bartlett et al.
(Continued)

FOREIGN PATENT DOCUMENTS

CN 208572340 U 3/2019
CN 111031462 A 4/2020
(Continued)

OTHER PUBLICATIONS

Notice of Rejection in Japanese Application No. 2022-564423 mailed on Dec. 18, 2023, 24 pages.
(Continued)

*Primary Examiner* — Norman Yu
(74) *Attorney, Agent, or Firm* — METIS IP LLC

(57) ABSTRACT

The present disclosure provides a microphone including at least one acoustoelectric transducer and an acoustic structure. The acoustoelectric transducer is configured to convert a sound signal to an electrical signal. The acoustic structure includes a sound guiding tube and an acoustic cavity. The acoustic cavity is in acoustic communication with the acoustoelectric transducer, and is in acoustic communication with outside of the microphone through the sound guiding tube. The acoustic structure has a first resonance frequency, the acoustoelectric transducer has a second resonance frequency, and an absolute value of a difference between the first resonance frequency and the second resonance frequency is not less than 100 Hz. By disposing different acoustic structures, resonance peaks in different frequency ranges may be added to the microphone, which improves a sensitivity of the microphone near multiple resonance peaks, thereby improving a sensitivity of the microphone in the entire wide frequency band.

18 Claims, 12 Drawing Sheets

(58) Field of Classification Search
CPC ........ H04R 1/22; H04R 1/2853; H04R 1/086; H04R 1/326
USPC ........ 381/174, 355, 369, 113, 189, 346, 354
See application file for complete search history.

(56) References Cited

U.S. PATENT DOCUMENTS

| | | | | |
|---|---|---|---|---|
| 6,151,399 | A | 11/2000 | Killion et al. | |
| 8,418,804 | B1 | 4/2013 | Hawwa | |
| 2008/0174665 | A1 * | 7/2008 | Enstad | H04N 7/142 348/E7.083 |
| 2009/0285432 | A1 * | 11/2009 | Schnitta | G10K 11/17861 381/353 |
| 2010/0142743 | A1 * | 6/2010 | Tanaka | H04R 1/38 381/361 |
| 2010/0189299 | A1 | 7/2010 | Grant et al. | |
| 2011/0235841 | A1 * | 9/2011 | Tanaka | H04R 1/38 381/355 |
| 2012/0250897 | A1 * | 10/2012 | Michel | H04R 19/04 381/111 |
| 2014/0064542 | A1 * | 3/2014 | Bright | H04R 1/086 381/359 |
| 2014/0126733 | A1 * | 5/2014 | Gauger, Jr. | G10K 11/17837 381/71.6 |
| 2014/0233756 | A1 | 8/2014 | Inoda | |
| 2017/0111731 | A1 | 4/2017 | Merks-Swolfs | |
| 2018/0077489 | A1 | 3/2018 | Yang | |
| 2018/0288546 | A1 | 10/2018 | Lesso et al. | |
| 2019/0141438 | A1 * | 5/2019 | Mackey | H04R 31/006 |
| 2019/0268679 | A1 * | 8/2019 | Kurihara | H04R 1/023 |
| 2019/0281381 | A1 | 9/2019 | Tao et al. | |
| 2020/0286492 | A1 * | 9/2020 | Lesso | G10L 25/18 |
| 2021/0204056 | A1 | 7/2021 | Bradt et al. | |
| 2022/0353606 | A1 | 11/2022 | Terashima et al. | |

FOREIGN PATENT DOCUMENTS

| | | | |
|---|---|---|---|
| CN | 210670559 | * | 6/2020 |
| CN | 213403429 | U | 6/2021 |
| EP | 2768240 | A1 | 8/2014 |
| JP | H10271195 | A | 10/1998 |
| JP | 2016131341 | A | 7/2016 |
| WO | 2020125940 | A1 | 6/2020 |

OTHER PUBLICATIONS

International Search Report in PCT/CN2021/112062 mailed on May 7, 2022, 10 pages.
Written Opinion in PCT/CN2021/112062 mailed on May 7, 2022, 8 pages.
Decision of Grant in Russian Application No. 2022122303 mailed on Feb. 13, 2023, 19 pages.
The Extended European Search Report in European Application No. 21923602.3 mailed on Apr. 11, 2023, 10 pages.

* cited by examiner

MICROPHONES

CROSS-REFERENCE TO RELATED APPLICATIONS

This application is a continuation of International Patent Application No. PCT/CN2021/112062, filed on Aug. 11, 2021, the entire contents of which are incorporated herein by reference.

TECHNICAL FIELD

The present disclosure generally relates to the field of acoustic devices, and in particular, to microphones.

BACKGROUND

Filtering and frequency division technologies are widely used in signal processing. As the basis of speech recognition, noise reduction, signal enhancement, and other signal processing technologies, filtering and frequency division technologies are widely used in electroacoustic, communication, image coding, echo cancellation, radar sorting, and other fields. A traditional filtering or frequency division technique is a technique using hardware circuits or software programs. The technique using hardware circuits to filter or divide signals is easily affected by the characteristics of electronic elements, and the hardware circuits are relatively complex. The technique using software algorithms for signal filtering or frequency division is computationally complex, time-consuming, and requires high computing resources. In addition, the traditional signal filtering or frequency division technique may be affected by a sampling frequency, which is likely to cause problems such as signal distortion, introduction of noise, etc.

Therefore, it is necessary to provide a more efficient signal frequency dividing device and method to simplify a structure of an acoustic device, and improve the quality factor (Q value) and sensitivity of the acoustic device.

SUMMARY

One of the embodiments of the present disclosure provides a microphone. The microphone includes at least one acoustoelectric transducer and an acoustic structure. The at least one acoustoelectric transducer is configured to convert a sound signal to an electrical signal. The acoustic structure may include a sound guiding tube and an acoustic cavity, the acoustic cavity is in acoustic communication with the at least one acoustoelectric transducer, and is in acoustic communication with an outside of the microphone through the sound guiding tube. The acoustic structure has a first resonance frequency, the at least one acoustoelectric transducer has a second resonance frequency, and an absolute value of a difference between the first resonance frequency and the second resonance frequency is not less than 100 Hz.

In some embodiments, a sensitivity of response of the microphone at the first resonance frequency is greater than a sensitivity of response of the at least one acoustoelectric transducer at the first resonance frequency.

In some embodiments, the first resonance frequency is related to one or more structural parameters of the acoustic structure, and the one or more structural parameters of the acoustic structure include at least one of a shape of the sound guiding tube, a size of the sound guiding tube, a size of the acoustic cavity, an acoustic resistance of the sound guiding tube or the acoustic cavity, or a roughness of an inner surface of a side wall forming the sound guiding tube.

In some embodiments, the at least one acoustoelectric transducer and the acoustic cavity are located within the housing, and the housing includes a first side wall for forming the acoustic cavity.

In some embodiments, a first end of the sound guiding tube is located on the first side wall, and a second end of the sound guiding tube is away from the first side wall and is located outside the housing.

In some embodiments, a first end of the sound guiding tube is located on the first side wall, and a second end of the sound guiding tube is away from the first side wall and extends into the acoustic cavity.

In some embodiments, a first end of the sound guiding tube is away from the first side wall and is located outside the housing, and a second end of the sound guiding tube extends into the acoustic cavity.

In some embodiments, a side wall of the sound guiding tube forms an inclination angle with a central axis of the sound guiding tube, and an angle value of the inclination angle is in a range from 0° to 20°.

In some embodiments, an acoustic resistance structure is disposed in the sound guiding tube or the acoustic cavity, and the acoustic resistance structure is configured to adjust a frequency bandwidth of the acoustic structure.

In some embodiments, an acoustic resistance value of the acoustic resistance structure is in a range from 1 MKS Rayls to 100 MKS Rayls.

In some embodiments, a thickness of the acoustic resistance structure is in a range from 20 μm to 300 μm, an aperture size of the acoustic resistance structure is in a range from 20 μm to 300 μm, and/or a porosity of the acoustic resistance structure is in a range from 30% to 50%.

In some embodiments, the acoustic resistance structure is disposed at one or more of positions including: an outer surface of a side wall forming the sound guiding tube and away from a first side wall, a position inside the sound guiding tube, an inner surface of the first side wall, a position inside the acoustic cavity, an inner surface of a second side wall forming a hole portion of the at least one acoustoelectric transducer, an outer surface of the second side wall, a position inside the hole portion of the at least one acoustoelectric transducer.

In some embodiments, an aperture size of the sound guiding tube is not greater than twice a length of the sound guiding tube.

In some embodiments, the aperture size of the sound guiding tube is in a range from 0.1 mm to 10 mm, and the length of the sound guiding tube is in a range from 1 mm to 8 mm.

In some embodiments, a roughness of an inner surface of a side wall forming the sound guiding tube is not greater than 0.8.

In some embodiments, an inner diameter of the acoustic cavity is not less than a thickness of the acoustic cavity.

In some embodiments, an inner diameter of the acoustic cavity is in a range from 1 mm to 20 mm, and a thickness of the acoustic cavity is in a range from 1 mm to 20 mm.

In some embodiments, the microphone further includes a second acoustic structure. The second acoustic includes a second sound guiding tube and a second acoustic cavity. The second acoustic cavity is in acoustic communication with the outside of the microphone through the second sound guiding tube. The second acoustic structure has a third resonance frequency that is different from the first resonance frequency.

In some embodiments, when the third resonance frequency is greater than the first resonance frequency, a difference between a sensitivity of response of the microphone at the third resonance frequency and a sensitivity of response of the at least one acoustoelectric transducer at the third resonance frequency is greater than a difference between a sensitivity of response of the microphone at the first resonance frequency and a sensitivity of response of the at least one acoustoelectric transducer at the first resonance frequency.

In some embodiments, the second acoustic cavity is in acoustic communication with the acoustic cavity through the sound guiding tube.

In some embodiments, the microphone includes a third acoustic structure. The third acoustic structure includes a third sound guiding tube, a fourth sound guiding tube, and a third acoustic cavity. The acoustic cavity is in acoustic communication with the third acoustic cavity through the third sound guiding tube. The second acoustic cavity is in acoustic communication with the outside of the microphone through the second sound guiding tube, and is in acoustic communication with the third acoustic cavity through the fourth sound guiding tube. The third acoustic cavity is in acoustic communication with the at least one acoustoelectric transducer. The third acoustic structure has a fourth resonance frequency that is different from the third resonance frequency and the first resonance frequency.

In some embodiments, the at least one acoustoelectric transducer further includes a second acoustoelectric transducer, the second acoustic cavity being in acoustic communication with the second acoustoelectric transducer.

In some embodiments, the microphone includes an electret microphone or a silicon microphone.

In some embodiments, the microphone includes at least one acoustoelectric transducer, a first acoustic structure, and a second acoustic structure. The at least one acoustoelectric transducer is configured to convert a sound signal to an electrical signal. The first acoustic structure includes a first sound guiding tube and a first acoustic cavity, the second acoustic structure includes a second sound guiding tube and a second acoustic cavity. The first sound guiding tube is in acoustic communication with an outside of the microphone, and the first acoustic cavity is in communication with the second acoustic cavity through the second sound guiding tube. The second acoustic cavity is in acoustic communication with the at least one acoustoelectric transducer. The first acoustic structure has a first resonance frequency, the second acoustic structure has a second resonance frequency, and the first resonant frequency and the second resonant frequency are different.

In some embodiments, the first resonance frequency or the second resonance frequency is in a range of 100 Hz-15000 Hz.

In some embodiments, the first resonance frequency is related to one or more structural parameters of the first acoustic structure, and the second resonance frequency is related to one or more structural parameters of the second acoustic structure.

Additional features will be set forth in part in the following description, and will become apparent to those skilled in the art upon review of the following content and drawings, or may be learned by actual production or operation. The features of the present disclosure may be realized and obtained by practicing or using the various aspects of the methods, tools and combinations set forth in the following detailed embodiments.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
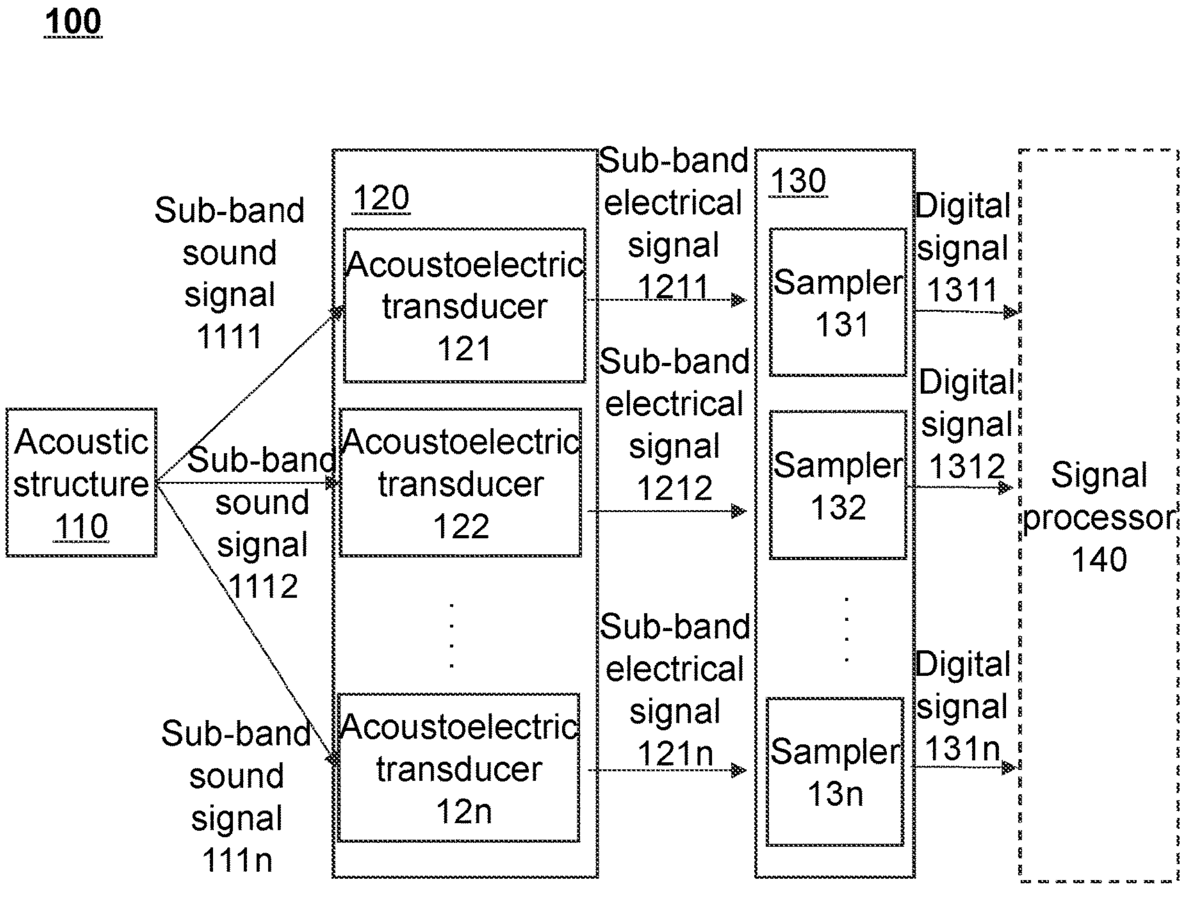
FIG. 1 is a schematic diagram illustrating an exemplary microphone according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the exemplary embodiments are provided merely for better comprehension and application of the present disclosure by those skilled in the art, and are not intended to limit the scope of the present disclosure. Unless obviously obtained from the context or the context illustrates otherwise, the same numeral in the drawings refers to the same structure or operation.

It will be understood that the term "system," "device," "unit," and/or "module", "component", "element" used herein are one method to distinguish different components, elements, parts, sections, or assembly of different levels in ascending order. However, the terms may be displaced by another expression if they achieve the same purpose.

Various terms are used to describe the spatial and functional relationships between elements (e.g., between components), including "connect," "join," "interface," and "couple." Unless expressly described as "directly", when the present disclosure describes a relationship between a first and second element, the relationship includes a direct relationship between the first and second elements without other intervening elements, and there is an indirect relationship (spatially or functionally) between a first and a second element by one or more intervening elements. In contrast, when an element is referred to as being "directly" connected, joined, interfaced, or coupled to another element, there are no intervening elements present. Additionally, the spatial and functional relationships between elements may be implemented in various ways. For example, the mechanical connection between the two elements may include a welded connection, a keyed connection, a pinned connection, an interference fit connection, or the like, or any combination thereof. Other words used to describe the relationship between the elements should be interpreted in a likely way (e.g., "between", "adjacent" versus "directly adjacent", etc.).

It should be understood that the terms "first," "second," "third," etc., as used herein, may be used to describe various elements. These are only used to distinguish one element from another and are not intended to limit the scope of the elements. For example, a first element could also be termed a second element, and similarly, a second element could also be termed a first element.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment"; the term "another embodiment" means "at least one additional embodiment". Relevant definitions of other terms will be given in the description below. Hereinafter, without loss of generality, the description of "microphone" will be used when describing the technology related to filtering/frequency division in the present disclosure. This description is only a form of conduction application, for those of ordinary skill in the art, "microphone" may also be replaced by other similar words, such as "hydrophone", "transducer", "acoustic-light modulator" or "acoustoelectric transducer device" etc. For those skilled in the art, after understanding the basic principle of the microphone device, various modifications and changes in form and details may be made to the specific manner and steps of implementing the microphone without departing from this principle. However, these corrections and changes are still within the protection scope of the present disclosure.

The present disclosure provides a microphone. The microphone may include at least one acoustoelectric transducer and an acoustic structure. At least one acoustoelectric transducer may be used to convert a sound signal to an electrical signal. The acoustic structure includes a sound guiding tube and an acoustic cavity. The acoustic cavity is in acoustic communication with the acoustoelectric transducer, and is in acoustic communication with the outside of the microphone through the sound guiding tube. The sound guiding tube and the acoustic cavity of the acoustic structure may form a filter with the function for adjusting frequency components of the sound. The scheme utilizes the structural characteristics of the acoustic structure itself to filter the sound signal and/or perform sub-band frequency division operation on the sound signal, which does not require many complex circuits to achieve filtering, thereby reducing the difficulty of circuit design. The filtering properties of the acoustic structure are determined by physical properties of its structure, and the filtering process occurs in real time.

In some embodiments, the acoustic structure may "amplify" sound at its corresponding resonance frequency. The resonance frequency of the acoustic structure may be adjusted by changing one or more structural parameters of the acoustic structure. The one or more structural parameters of the acoustic structure may include a shape of the sound guiding tube, a size of the sound guiding tube, a size of the acoustic cavity, an acoustic resistance of the sound guiding tube or the acoustic cavity, a roughness of an inner surface of a side wall of the sound guiding tube, a thickness of a sound absorbing material in the sound guiding tube, or the like, or a combination thereof.

In some embodiments, by disposing multiple acoustic structures with different resonance frequencies in parallel, in series, or a combination thereof, frequency components corresponding to different resonance frequencies in the sound signal may be screened out respectively, so that the sub-band frequency division of the sound signal may be realized. In this case, the frequency response of the microphone may be regarded as frequency response with a high signal-to-noise ratio formed by the fusion of frequency responses of different acoustic structures, the corresponding frequency response curve may be flatter (e.g., the frequency response curve 2210 shown in FIG. 22). On the one hand, the microphone provided by the embodiments of the present disclosure may perform an sub-band frequency division operation on a full-band signal through its own structure without using hardware circuits (e.g., filter circuits) or software algorithms, which avoids the problems such as complex hardware circuit design, high computational resources occupied by software algorithms, signal distortion, and noise introduction, thereby reducing the complexity and production cost of the microphone. On the other hand, the microphone provided by the embodiments of the present disclosure may output a flatter frequency response curve with a high signal-to-noise ratio, thereby improving the signal quality of the microphone. In addition, by disposing different acoustic structures, resonance peaks in different frequency ranges may be added to the microphone system, which improves the sensitivity of the microphone near the resonance peaks, thereby improving the sensitivity of the microphone in the entire wide frequency band.

FIG. 1 is a schematic diagram illustrating an exemplary microphone according to some embodiments of the present disclosure. As shown in FIG. 1, a microphone 100 may include an acoustic structure 110, at least one acoustoelectric transducer 120, a sampler 130, and a signal processor 140.

In some embodiments, the microphone 100 may include any sound signal processing device (e.g., a microphone, a hydrophone, an acoustic-light modulator, etc., or other acoustoelectric transducer devices) that converts a sound signal to an electrical signal. In some embodiments, according to the principle of transduction, the microphone 100 may include a moving coil microphone, a ribbon microphone, a condenser microphone, a piezoelectric microphone, an electret microphone, an electromagnetic microphone, a carbon particle microphone, or the like, or any combination thereof. In some embodiments, according to the sound collection manner, the microphone 100 may include a bone conduction microphone, an air conduction microphone, or the like, or a combination thereof. In some embodiments, according to the production process, the microphone 100 may include an electret microphone, a silicon microphone, or the like. In some embodiments, the microphone 100 may be installed in a device with sound pickup function such as a mobile device (e.g., a cell phone, a voice recorder, etc.), a tablet computer, a laptop computer, an in-vehicle device, a monitoring device, a medical device, a sports equipment, a toy, a wearable device (e.g., a headphone, a helmet, glasses, a necklace, etc.), etc.

The acoustic structure 110 may transmit an external sound signal to the at least one acoustoelectric transducer 120. When the sound signal passes through the acoustic structure 110, the acoustic structure 110 may perform certain adjustments (e.g., filtering, changing a bandwidth of the sound signal, amplifying the sound signal of a specific frequency, etc.) to the sound signal. In some embodiments, the acoustic structure 110 may include a sound guiding tube and an acoustic cavity. The acoustic cavity is in acoustic communication with the acoustoelectric transducer 120 for transmitting the sound signal adjusted by the acoustic structure 110 to the acoustoelectric transducer 120. The acoustic cavity may be in acoustic communication with the external environment of the microphone 100 through the sound guiding tube for receiving the sound signal. The sound signal may come from any sound source capable of generating an audio signal. The sound source may be a living body (e.g., a user of the microphone 100), a non-living body (e.g., a CD player, a television, a stereo, etc.), or the like, or a combination thereof. In some embodiments, the sound signal may include an ambient sound.

In some embodiments, the acoustic structure 110 has a first resonance frequency, which indicates that a frequency component of the sound signal at the first resonance frequency may resonate, thereby increasing a volume of the frequency component transmitted to the acoustoelectric transducer 120. Therefore, the disposing of the acoustic structure 110 may make the frequency response curve of the microphone 100 generate a resonance peak at the first resonance frequency, so that the sensitivity of the microphone 100 may be improved in a certain frequency band including the first resonance frequency. More descriptions regarding the influence of the acoustic structure 110 on the frequency response curve of the microphone 100 may refer to FIG. 2A to FIG. 22 and the descriptions thereof.

In some embodiments, a count of the acoustic structure 110 in the microphone 100 may be set according to actual requirements. For example, the microphone 100 may include multiple (e.g., 2, 3, 5, 6-24, etc.) acoustic structures 110. In some embodiments, the multiple acoustic structures 110 in the microphone 100 may have different frequency responses. For example, the multiple acoustic structures 110 in the microphone 100 may have different resonance frequencies or frequency bandwidths. A frequency bandwidth may refer to a frequency range between the 3 dB points of a frequency response curve. In some embodiments, after being processed by the multiple acoustic structures 110, the sound signal may be frequency divided to generate a plurality of sub-band sound signals (e.g., a sub-band sound signal 1111, a sub-band sound signal 1112, . . . , a sub-band sound signal 111*n*) having different frequency ranges. A sub-band sound signal refers to a signal whose frequency bandwidth is less than the frequency bandwidth of the original sound signal. The frequency band of a sub-band sound signal may be within the frequency band of the sound signal. For example, the frequency band range of the sound signal may be 100 Hz-20000 Hz, and the acoustic structure 110 may be provided to filter the sound signal to generate a sub-band sound signal whose frequency band range may be 100 Hz-200 Hz. As another example, eleven acoustic structures 110 may be provided to divide the frequency of the sound signal to generate eleven sub-band sound signals, frequency bands of which may be 500 Hz-700 Hz, 700 Hz-1000 Hz, 1000 Hz-1300 Hz, 1300 Hz-1700 Hz, 1700 Hz-2200 Hz, 2200 Hz-3000 Hz, 3000 Hz-3800 Hz, 3800 Hz-4700 Hz, 4700 Hz-5700 Hz, 5700 Hz-7000 Hz, and 7000 Hz-12000 Hz, respectively. As a further example, sixteen acoustic structures 110 may be provided to divide the sound signal to generate sixteen sub-band sound signals, the frequency bands of which may be 500 Hz-640 Hz, 640 Hz-780 Hz, 780 Hz-930 Hz, 940 Hz-1100 Hz, 1100 Hz-1300 Hz, 1300 Hz-1500 Hz, 1500 Hz-1750 Hz, 1750 Hz-1900 Hz, 1900 Hz-2350 Hz, 2350 Hz-2700 Hz, 2700 Hz-3200 Hz, 3200 Hz-3800 Hz, 3800 Hz-4500 Hz, 4500 Hz-5500 Hz, 5500 Hz-6600 Hz, and 6600 Hz-8000 Hz, respectively. As another example, twenty-six acoustic structures 110 may be provided to divide the sound signal to generate twenty-six sub-band sound signals, the frequency bands of which may be 20 Hz-120 Hz, 120 Hz-210 Hz, 210 Hz-320 Hz, 320 Hz-410 Hz, 410 Hz-500 Hz, 500 Hz-640 Hz, 640 Hz-780 Hz, 780 Hz-930 Hz, 940 Hz-1100 Hz, 1100 Hz-1300 Hz, 1300 Hz-1500 Hz, 1500 Hz-1750 Hz, 1750 Hz-1900 Hz, 1900 Hz-2350 Hz, 2350 Hz-2700 Hz, 2700 Hz-3200 Hz, 3200 Hz-3800 Hz, 3800 Hz-4500 Hz, 4500 Hz-5500 Hz, 5500 Hz-6600 Hz, 6600 Hz-7900 Hz, 7900 Hz-9600 Hz, 9600 Hz-12100 Hz, and 12100 Hz-16000 Hz, respectively. Using the acoustic structure for filtering and frequency division, the sound signal may be filtered and/or frequency divided in real-time, thereby reducing the noise introduced in the subsequent hardware processing of the sound signal and avoiding signal distortion.

In some embodiments, the multiple acoustic structures 110 in the microphone 100 may be disposed in parallel, in series, or a combination thereof. For details on the disposing of the multiple acoustic structures, please refer to FIGS. 17-20 and the descriptions thereof.

The acoustic structure 110 may be connected with the acoustoelectric transducer 120. The acoustoelectric transducer 120 may be configured to transmit the sound signal adjusted by the acoustic structure 110 to the acoustoelectric transducer 120 to be converted to an electrical signal. In some embodiments, the acoustoelectric transducer 120 may include a capacitive acoustoelectric transducer, a piezoelectric acoustoelectric transducer, or the like, or a combination thereof. In some embodiments, a vibration of the sound signal (e.g., an air vibration, a solid vibration, a liquid vibration, a magneto-induced vibration, an electro-induced vibration, etc.) may cause changes in one or more parameters (e.g., a capacitance, an electric charge, an acceleration, a light intensity, a frequency response, etc., or a combination thereof) of the acoustoelectric transducer 120. The changed parameters may be detected by electrical techniques and an electrical signal corresponding to the vibration may be output. For example, a piezoelectric acoustoelectric transducer may be an element that converts a measured change in a non-electrical signal (e.g., a pressure, a displacement, etc.) into a change in voltage. For instance, the piezoelectric acoustoelectric transducer may include a cantilever beam structure (or a diaphragm structure). The cantilever beam structure may be deformed under the action of the received sound signal, and the inverse piezoelectric effect caused by the deformed cantilever beam structure may generate the electrical signal. As another example, the capacitive acoustoelectric transducer may be an element that converts a measured change in a non-electrical signal (e.g., a displacement, a pressure, a light intensity, an acceleration, etc.) into a change in capacitance. For example, the capacitive acoustoelectric transducer may include a first cantilever beam structure and a second cantilever beam structure. The first cantilever beam structure and the second cantilever beam structure may deform to different degrees under vibration, so that a distance between the first cantilever beam structure and the second cantilever beam structure changes. The first cantilever beam structure and the second cantilever beam structure may convert the change of the distance therebetween into the change of capacitance, to realize the conversion of the vibration signal to the electrical signal. In some embodiments, different acoustoelectric transducers 120 may have the same or different frequency responses. For example, acoustoelectric transducers 120 with different frequency responses may detect the same sound signal, and the different acoustoelectric transducers 120 may generate sub-band electrical signals with different resonance frequencies.

In some embodiments, the count of the acoustoelectric transducers 120 may be one or more. For example, the acoustoelectric transducers 120 may include an acoustoelectric transducer 121, an acoustoelectric transducer 122, . . . , an acoustoelectric transducer **12*n*. In some embodiments, one or more acoustoelectric transducers of the acoustoelectric transducers 120 may communicate with the acoustic structure 110 in a variety of ways. For example, the multiple acoustic structures 110 in the microphone 100 may be connected to the same acoustoelectric transducer 120. As another example, each acoustic structure of the multiple acoustic structures 110 may be connected with one acoustoelectric converter 120**.

In some embodiments, one or more of the acoustoelectric transducers 120 may be used to convert a sound signal transmitted by the acoustic structure 110 to an electrical signal. For example, the acoustoelectric transducer 120 may convert the sound signal filtered by the acoustic structure 110 to a corresponding electrical signal. As another example, several acoustoelectric transducers of the acoustoelectric transducers 120 may respectively convert sub-band sound signals obtained by frequency division of the multiple acoustic structures 110 to several corresponding sub-band electrical signals. Merely by way of example, the acoustoelectric transducer 120 may convert a sub-band sound signal 1111, a sub-band sound signal 1112, . . . , and a sub-band sound signal **111*n* to a sub-band electrical signal 1211, a sub-band electrical signal 1212, . . . , and a sub-band electrical signal 121*n***.

The acoustoelectric transducer 120 may transmit the generated sub-band electrical signal (or electrical signal) to the sampler 130. In some embodiments, one or more sub-band electrical signals may be separately transmitted over different parallel line media. In some embodiments, a plurality of sub-band electrical signals may also be output in a specific format through a common line medium according to a specific protocol rule. In some embodiments, the specific protocol rule may include, but is not limited to, one or more of direct transmission, amplitude modulation, frequency modulation, and the like. In some embodiments, the line medium may include one or more of, but is not limited to, a coaxial cable, a communication cable, a flexible cable, a spiral cable, a non-metal sheathed cable, a metal sheathed cable, a multi-core cable, a twisted pair cable, a ribbon cable, a shielded cable, a telecommunication cable, a twin-stranded cable, a parallel twin core wire, a twisted pair wire, an optical fiber, an infrared ray, an electromagnetic wave, an acoustic wave, etc. In some embodiments, the specific format may include one or more of, but are not limited to, CD, WAVE, AIFF, MPEG-1, MPEG-2, MPEG-3, MPEG-4, MIDI, WMA, RealAudio, VQF, AMR, APE, FLAC, AAC, etc. In some embodiments, a transmission protocol may include one or more of, but are not limited to, AES3, EBU, ADAT, I2S, TDM, MIDI, CobraNet, Ethernet AVB, Dante, ITU-T G.728, ITU-T G.711, ITU-T G.722, ITU-T G.722.1, ITU-T G.722.1 Annex C, AAC-LD, etc.

The sampler 130 may communicate with the acoustoelectric transducer 120 and be configured to receive the one or more sub-band electrical signals generated by the acoustoelectric transducer 120 and sample the one or more sub-band electrical signals to generate corresponding digital signals.

In some embodiments, the sampler 130 may include one or more samplers (e.g., a sampler 131, a sampler 132, . . . , and a sampler **13*n*). Each sampler may sample each sub-band electrical signal. For example, the sampler 131 may sample the sub-band electrical signal 1211 to generate a digital signal 1311. As another example, the sampler 132 may sample the sub-band electrical signal 1212 to generate a digital signal 1312. As another example, the sampler 13*n* may sample the sub-band electrical signal 121*n* to generate a digital signal 131*n***.

In some embodiments, the sampler(s) 130 may sample the sub-band electrical signals using a bandpass sampling technique. For example, a sampling frequency of the sampler 130 may be determined according to the frequency bandwidth (3 dB) of the sub-band electrical signal. In some embodiments, the sampler(s) 130 may sample the sub-band electrical signals with a sampling frequency that is no less than twice the highest frequency in the sub-band electrical signal. In some embodiments, the sampler(s) 130 may sample the sub-band electrical signals with a sampling frequency that is no less than twice the highest frequency in the sub-band electrical signal and no greater than four times the highest frequency in the sub-band electrical signal. Compared with traditional sampling techniques (e.g., a bandwidth sampling technique, a lowpass sampling technique, etc.), using the bandpass sampling technique for sampling, the sampler 130 may use a relatively lower sampling frequency for sampling, thereby reducing the difficulty and cost of the sampling process.

In some embodiments, the sampling frequency of the sampler 130 may affect a sampling cutoff frequency of the sampler 130. In some embodiments, the higher the sampling frequency is, the higher the cutoff frequency is, and the larger the sampleable frequency band range is. When the signal processor 140 processes the digital signal generated by the sampler 130, under the same number of Fourier transform points, the higher the sampling frequency, the lower the corresponding frequency resolution. Therefore, for sub-band electrical signals located in different frequency ranges, the sampler 130 may use different sampling frequencies for sampling. For example, for a sub-band electrical signal located in the low frequency range (e.g., a sub-band electrical signal whose frequency is less than a first frequency threshold), the sampler 130 may use a lower sampling frequency, thereby making the sampling cutoff frequency to be relatively low. As another example, for a sub-band electrical signal located in the middle and high frequency range (e.g., a sub-band electrical signal whose frequency is greater than a second frequency threshold and less than a third frequency threshold), the sampler 130 may use a higher sampling frequency, thereby making the sampling cutoff frequency to be relatively high. As a further example, the sampling cutoff frequency of the sampler 130 may be 0 Hz-500 Hz higher than a frequency of the 3 dB bandwidth frequency point of the resonance frequency of a sub-band.

The sampler 130 may transmit the generated one or more digital signals to the signal processor 140. The transmission of the one or more digital signals may be separately transmitted over different parallel line media. In some embodiments, the one or more digital signals may also share a line medium and be transmitted in a specific format according to a specific protocol rule. More descriptions regarding the transmission of the digital signals may be refer to the transmission of sub-band electrical signals.

The signal processor 140 may receive and process data received from other components of the microphone 100. For example, the signal processor 140 may process digital signals transmitted from the sampler 130. In some embodiments, the signal processor 140 may individually process each sub-band electrical signal transmitted from the sampler 130 to generate the corresponding digital signal. For example, for different sub-band electrical signals (e.g., sub-band electrical signals processed by different acoustic structures, acoustoelectric transducers, etc.) that may have different phases, corresponding frequencies, etc., the signal processor 140 may process each sub-band electrical signal. In some embodiments, the signal processor 140 may acquire multiple sub-band electrical signals from the sampler 130 and process (e.g., fusing) the multiple sub-band electrical signals to generate a broadband signal of the microphone 100.

In some embodiments, the signal processor 140 may further include one or more of an equalizer, a dynamic range controller, a phase processor, and the like. In some embodiments, the equalizer may be configured to gain and/or attenuate the digital signal output by the sampler 130 according to a specific frequency band (e.g., a frequency band corresponding to the digital signal). Gaining the digital signal refers to increasing the amount of signal amplification; attenuating the digital signal refers to reducing the amount of signal amplification. In some embodiments, the dynamic range controller may be configured to compress and/or amplify the digital signal. The compressing and/or amplifying the sub-band electrical signal refers to reducing and/or increasing a ratio between an input signal and an output signal of the microphone 100. In some embodiments, the phase processor may be configured to adjust a phase of the digital signal. In some embodiments, the signal processor 140 may be located inside the microphone 100. For example, the signal processor 140 may be in the acoustic cavity formed independently of the housing structure of the microphone 100. In some embodiments, the signal processor 140 may also be located in other electronic devices, such as a headset, a mobile device, a tablet, a laptop, or the like, or any combination thereof. In some embodiments, the mobile device may include, but is not limited to, a cell phone, a smart home device, a smart mobile device, or the like, or any combination thereof. In some embodiments, the smart home device may include a control device of a smart appliance, a smart monitoring device, a smart TV, a smart camera, or the like, or any combination thereof. In some embodiments, the smart mobile device may include a smartphone, a personal digital assistant (PDA), a gaming device, a navigation device, a POS device, or the like, or any combination thereof.

The foregoing description of the microphone 100 is for illustrative purposes only and is not intended to limit the scope of the present disclosure. For persons having ordinary skills in the art, multiple variations and modifications may be made under the teachings of the present disclosure. For example, the sampler 130 and the signal processor 140 may be integrated in one component (e.g., an application specific integrated circuit (ASIC)). However, those variations and modifications do not depart from the scope of the present disclosure.

Figure 2A:
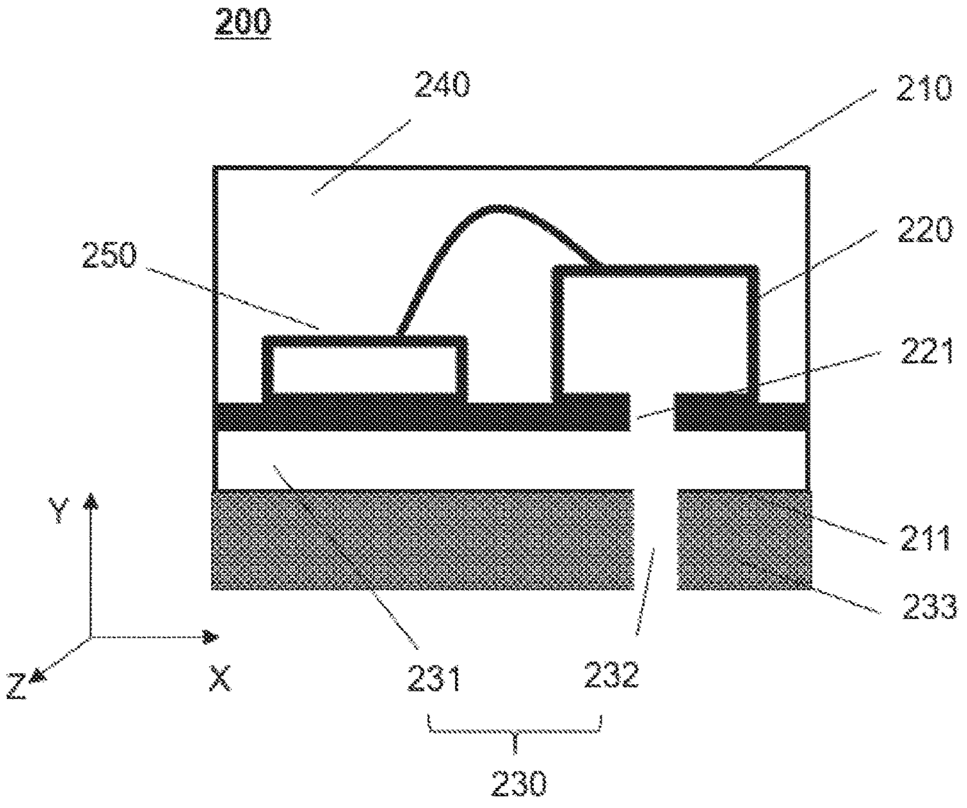
FIG. 2A is a schematic diagram illustrating an exemplary microphone according to some embodiments of the present disclosure.

FIG. 2A is a schematic diagram illustrating an exemplary microphone according to some embodiments of the present disclosure. As shown in FIG. 2A, the microphone 200 may include a housing 210, at least one acoustoelectric transducer 220, and an acoustic structure 230.

Figure 2B:
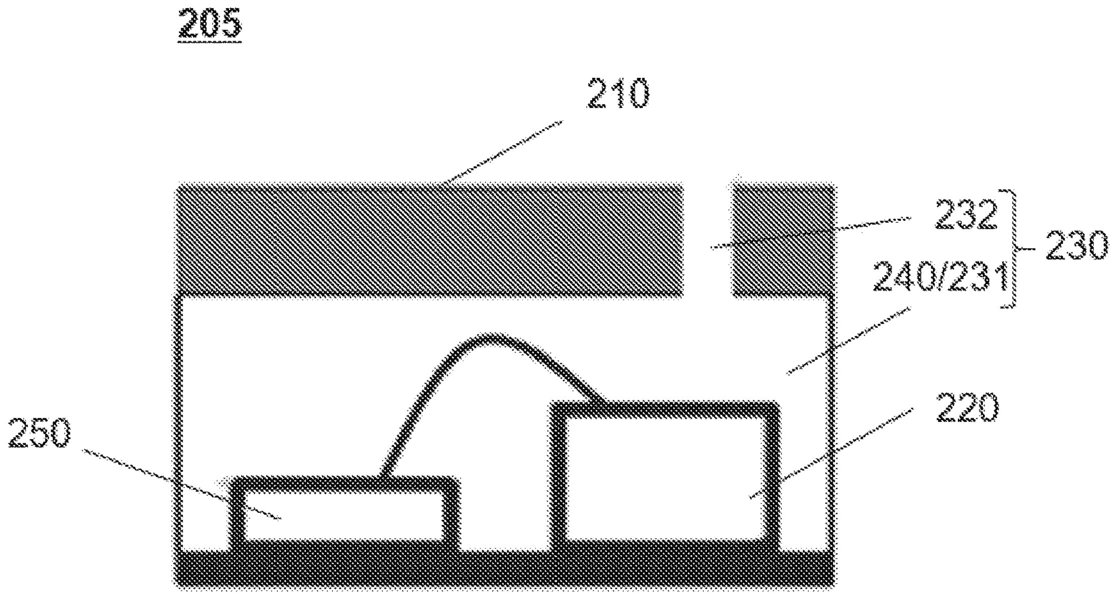
FIG. 2B is a schematic diagram illustrating an exemplary microphone according to some embodiments of the present disclosure.

The housing 210 may be configured to accommodate one or more components of the microphone 200 (e.g., at least one acoustoelectric transducer 220, at least a portion of the acoustic structure 230, etc.). In some embodiments, the housing 210 may be a regular structure such as a cuboid, a cylinder, a prism, a truncated cone, or other irregular structures. In some embodiments, the housing 210 is a hollow structure, and may form one or more acoustic cavities, for example, an acoustic cavity 231 and an acoustic cavity 240. The acoustic cavity 240 may accommodate the acoustoelectric transducer 220 and an application specific integrated circuit 250. The acoustic cavity 231 may accommodate or be at least a portion of the acoustic structure 230. In some embodiments, the housing 210 may include only one acoustic cavity. As an example, FIG. 2B is a schematic diagram illustrating an exemplary microphone according to some embodiments of the present disclosure. The housing 210 of the microphone 205 may form the acoustic cavity 240. One or more components of microphone 205, for example, the acoustoelectric transducer 220, the application specific integrated circuit 250, and at least a portion of the acoustic structure 230 (e.g., the acoustic cavity 231), may be located in the acoustic cavity 231. In such cases, the acoustic cavity 240 formed by the housing 210 may overlap with the acoustic cavity 231 of the acoustic structure 230. The acoustic structure 230 may be in direct acoustic communication with the acoustoelectric transducer 220. The direct acoustic communication between the acoustic structure 230 and the acoustoelectric transducer 220 may be understood as: the acoustoelectric transducer 220 may include a "front cavity" and a "rear cavity", and a sound signal in the "front cavity" or "rear cavity" may cause a change in one or more parameters of the acoustoelectric transducer 220. In the microphone 200 shown in FIG. 2A, the sound signal passes through the acoustic structure 230 (e.g., a sound guiding tube 232 and the acoustic cavity 231), and then passes through a hole portion 221 of the acoustoelectric transducer 220 to the "rear cavity" of the acoustoelectric transducer 220, causing a change in one or more parameters of the acoustoelectric transducer 220. In the microphone 205 shown in FIG. 2B, the acoustic cavity 240 formed by the housing 210 overlaps with the acoustic cavity 231 of the acoustic structure 230, and it may be considered that the "front cavity" of the acoustoelectric transducer 220 overlaps with the acoustic cavity 231 of the acoustic structure, the sound signal directly causes a change in one or more parameters of the acoustoelectric transducer 220 after passing through the acoustic structure 230. For the convenience of description, the acoustic cavity 231 and the acoustic cavity 240 do not overlap (as shown in FIG. 2A), and at least one acoustoelectric transducer 220 is disposed in the acoustic cavity 240 may be taken as an example in the present disclosure. The descriptions may be the same or similar in the case where the acoustic cavity 231 and the acoustic cavities 240 coincide.

In some embodiments, the material of the housing 210 may include one or more of, but is not limited to, a metal, an alloy material, a polymer material (e.g., acrylonitrile-butadiene-styrene copolymer, polyvinyl chloride, polycarbonate, polypropylene, etc.), or the like.

In some embodiments, the at least one acoustoelectric transducer 220 may be used to convert a sound signal to an electrical signal. The at least one acoustoelectric transducer 220 may include one or more hole portions 221. The acoustic structure 230 may communicate with the at least one acoustoelectric transducer 220 through the one or more hole portions 221 of the acoustoelectric transducer 220, and transmit a sound signal adjusted by the acoustic structure 230 to the acoustoelectric transducer 220. For example, after the external sound signal picked up by the microphone 200 is adjusted (e.g., filtered, frequency divided, amplified, etc.) by the acoustic structure 230, the sound signal may enter the cavity (if any) of the acoustoelectric transducer 220 through the hole portion 221. The acoustoelectric transducer 220 may pick up the sound signal and convert it to an electrical signal.

In some embodiments, the acoustic structure 230 may include an acoustic cavity 231 and a sound guiding tube 232. The acoustic structure 230 may communicate with the outside of the microphone 200 through the sound guiding tube 232. In some embodiments, the housing 210 may include a plurality of side walls for forming a space within the housing. The sound guiding tube 232 may be located on a first side wall 211 of the housing 210 for forming the acoustic cavity 231. Specifically, a first end of the sound guiding tube 232 (e.g., an end close to the acoustic cavity 231) may be located on the first side wall 211 of the housing 210, and a second end of the sound guiding tube 232 (e.g., an end relatively far from the acoustic cavity 231) may be away from the first side wall 211 and be located outside the housing 210. The external sound signal may enter the sound guiding tube 232 from the second end of the sound guiding tube 232 and be transmitted to the acoustic cavity 231 from the first end of the sound guiding tube 232. In some embodiments, the sound guiding tube 232 of the acoustic structure 230 may also be disposed at other suitable positions. For more descriptions for the position setting of the sound guiding tube, please refer to FIGS. 5 to 9 and the descriptions thereof.

In some embodiments, the acoustic structure 230 may have a first resonance frequency, that is, a component of the first resonance frequency in the sound signal may resonate in the acoustic structure 230. In some embodiments, the first resonance frequency is related to structural parameters of the acoustic structure 230. The structural parameters of the acoustic structure 230 may include a shape of the sound guiding tube 232, a size of the sound guiding tube 232, a size of the acoustic cavity 231, an acoustic resistance of the sound guiding tube 232 or the acoustic cavity 231, a roughness of an inner surface of the side wall of the sound guiding tube 232, a thickness of a sound absorbing material (e.g., a fibrous material, a foam material, etc.) in the sound guiding tube, a stiffness of the inner wall of the acoustic cavity, or the like, or a combination thereof. In some embodiments, by setting the structural parameters of the acoustic structure 230, the sound signal adjusted by the acoustic structure 230 may have a resonance peak at the first resonance frequency after being converted into the electrical signal.

Figure 3:
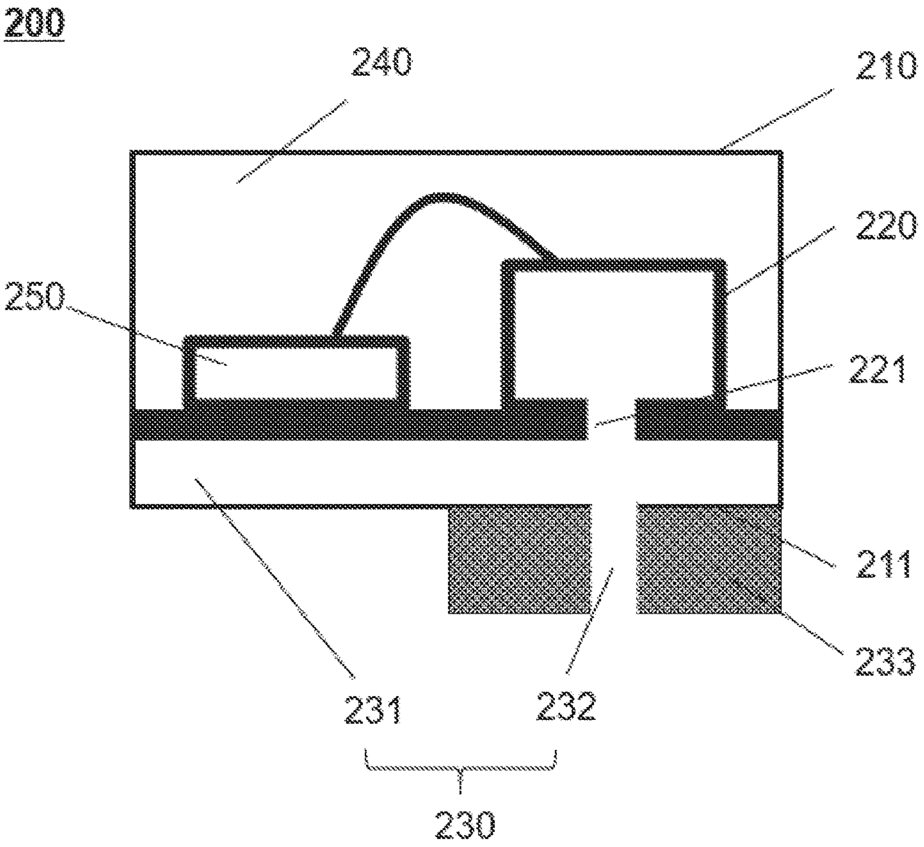
FIG. 3 is a schematic diagram illustrating an exemplary microphone according to some embodiments of the present disclosure.

The shape of the sound guiding tube 232 may include regular and/or irregular shapes such as a cuboid, a cylinder, and a polygonal prism. In some embodiments, the sound guiding tube 232 may be surrounded by one or more side walls. The shape of the side wall 233 of the sound guide tube 232 may be a regular structure such as a cuboid and a cylinder, and/or an irregular structure. In some embodiments, as shown in FIG. 2A, a length of the side wall 233 of the sound guiding tube 232 (e.g., in FIG. 2A, a sum of a length of the side wall 233 along the X-axis direction and an aperture size of the sound guiding tube 232) may be the same as the length of the housing 210 in the X-axis direction. In some embodiments, the length of the side wall 233 of the sound guiding tube 232 may be different from the length of the housing 210. For example, FIG. 3 is a schematic diagram illustrating an exemplary microphone according to some embodiments of the present disclosure. As shown in FIG. 3, the first end of the sound guiding tube 232 is located on the first side wall 211 of the housing 210, and the second end of the sound guiding tube 232 is away from the first side wall 211 and located outside the housing 210. The length of side wall 233 of the hole of the sound guiding tube 232 along the X-axis direction is less than the length of the housing 210 along the X-axis direction.

Structural parameters such as the aperture size and the length of the sound guiding tube 232, and structural parameters such as the inner diameter, the length, and the thickness of the acoustic cavity 231 may be set as required (e.g., the target resonance frequency, the target frequency bandwidth, etc.). The length of the sound guiding tube refers to a total length of the sound guiding tube 232 along a direction of the central axis of the sound guiding tube (e.g., the Y-axis direction in FIG. 2A). In some embodiments, the length of the sound guiding tube 232 may be an equivalent length of the sound guiding tube, that is, the length of the sound guiding tube in the direction of the central axis plus a product of an aperture size of the sound guiding tube and a length correction factor. As shown in FIG. 2A, the length of the acoustic cavity 231 refers to a size of the acoustic cavity 231 along the X-axis direction. The thickness of the acoustic cavity 231 refers to a size of the acoustic cavity 231 along the Y-axis direction. In some embodiments, the aperture size of the sound guiding tube 232 may be no greater than twice the length of the sound guiding tube 232. In some embodiments, the aperture size of the sound guiding tube 232 may be no greater than 1.5 times the length of the sound guiding tube 232. For example, if a cross section (e.g., a cross section that is perpendicular to the direction of the central axis of the sound guiding tube, (e.g., a cross section parallel to the XZ plane)) of the sound guiding tube 232 is circular, the aperture size of the sound guiding tube 232 may be between 0.5 mm and 10 mm, and the length of the sound guiding tube 232 may be within the range from 1 mm to 8 mm. As another example, if the cross section of the sound guiding tube 232 is circular, the aperture size of the sound guiding tube 232 may be in the range from 1 mm to 4 mm, and the length of the sound guiding tube 232 may be 1 mm-10 mm. In some embodiments, an inner diameter of the acoustic cavity 231 may be not less than the thickness of the acoustic cavity 231. In some embodiments, the inner diameter of the acoustic cavity 231 may be not less than 0.8 times the thickness of the acoustic cavity 231. For example, if the cross section of the acoustic cavity 231 perpendicular to its length direction (e.g., the cross section of the acoustic cavity 231 parallel to the YZ plane) is circular, the inner diameter of the acoustic cavity 231 may be in the range from 1 mm to 20 mm, and the thickness of the acoustic cavity 231 may be in the range from 1 mm to 20 mm. In some embodiments, if the cross section of the acoustic cavity 231 is circular, the inner diameter of the acoustic cavity 231 may be in the range from 1 mm to 15 mm, and the thickness of the acoustic cavity 231 may be in the range from 1 mm to 10 mm.

It should be noted that the shape of the cross section of the acoustic cavity 231 and/or the sound guiding tube 232 is not limited to the above-mentioned circle, and may also be other shapes, such as a rectangle, an ellipse, a pentagon, and the like. In some embodiments, when the shape of the cross section of the acoustic cavity 231 and/or the sound guiding tube 232 is any of other shapes (non-circular), the inner diameter of the acoustic cavity 231 and/or the aperture size (or the thickness, the length, etc.) of the sound guiding tube 232 may be equivalent to an equivalent inner diameter or an equivalent aperture size. Taking the equivalent inner diameter as an example, an equivalent inner diameter of the acoustic cavity 231 with any other cross-sectional shape may be represented by the inner diameter of the acoustic cavity and/or the sound guiding tube having the circular cross-sectional shape equal to its volume. For example, if the cross section of the acoustic cavity 231 is square, the equivalent inner diameter of the acoustic cavity 231 may be in the range of 1 mm to 6 mm, and the thickness of the acoustic cavity 231 may be in the range from 1 mm to 4 mm. As another example, if the cross section of the acoustic cavity 231 is square, the equivalent inner diameter of the acoustic cavity 231 may be in the range of 1 mm to 5 mm, and the thickness of the acoustic cavity 231 may be in the range from 1 mm to 3 mm.

In some embodiments, the side wall 233 of the acoustic guiding tube 232 may be made of one or more materials. The material of the side wall 233 may include, but is not limited to, one or more of a semiconductor material, a metal material, a metal alloy, an organic material, and the like. In some embodiments, the semiconductor material may include, but is not limited to, silicon, silicon dioxide, silicon nitride, silicon carbide, and the like. In some embodiments, the metal material may include, but is not limited to, copper, aluminum, chromium, titanium, gold, and the like. In some embodiments, the metal alloy may include, but is not limited to, copper-aluminum alloy, copper-gold alloy, titanium alloy, aluminum alloy, and the like. In some embodiments, the organic material may include, but is not limited to, polyimide (PI), parylene, polydimethylsiloxane (PDMS), silicone, silica gel, and the like.

The foregoing description of the microphone 200 is for illustrative purposes only and is not intended to limit the scope of the present disclosure. For persons having ordinary skills in the art, multiple variations and modifications may be made under the teachings of the present disclosure. However, those variations and modifications do not depart from the scope of the present disclosure.

Figure 4:
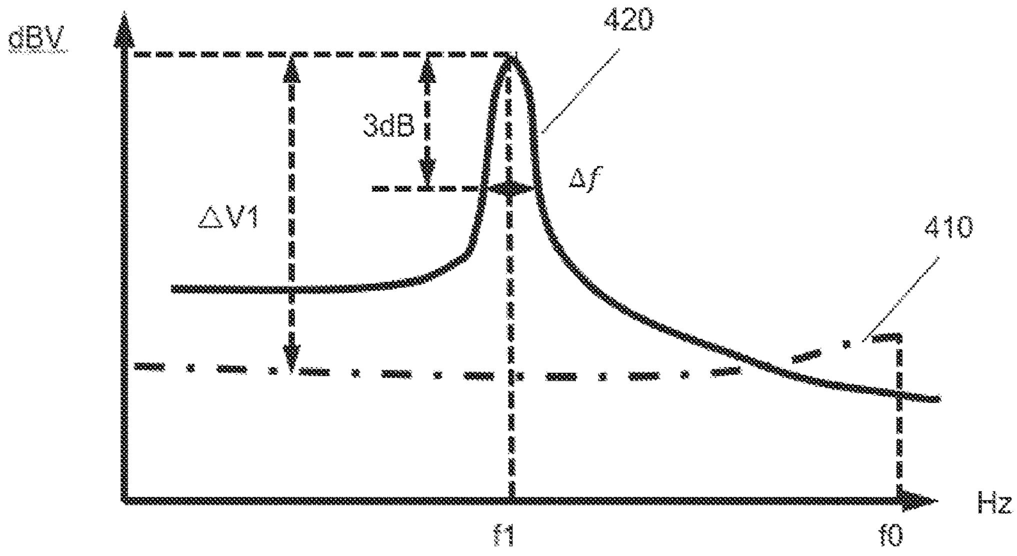
FIG. 4 is a schematic diagram illustrating a frequency response curve of an exemplary microphone according to some embodiments of the present disclosure.

FIG. 4 is a schematic diagram illustrating a frequency response curve of an exemplary microphone according to some embodiments of the present disclosure. As shown in FIG. 4, the frequency response curve 410 is a frequency response curve of an acoustoelectric transducer (e.g., the acoustoelectric transducer 220), and the frequency response curve 420 is a frequency response curve of an acoustic structure (e.g., the acoustic structure 230). When the frequency response curve 410 has a resonance peak at a frequency $f_0$, the frequency $f_0$ may be referred to as a resonance frequency (also referred to as a second resonance frequency) of the acoustoelectric transducer. In some embodiments, the resonance frequency of the acoustoelectric transducer is related to structural parameters of the acoustoelectric transducer. The structural parameters of the acoustoelectric transducer (e.g., the acoustoelectric transducer 220) may include a material, a size, a mass, a type (e.g., a piezoelectric type, a capacitive type, etc.), an arrangement manner, etc., of the acoustoelectric transducer. At the frequency $f_1$ of the frequency response curve 420, the acoustic structure resonates with the received sound signal, so that a signal of a frequency band including the frequency $f_1$ is amplified, and the resonance frequency $f_0$ may be referred to as the resonance frequency of the acoustic structure (also referred to as a first resonance frequency). The resonance frequency of the acoustic structure may be expressed as Equation (1):

$$f = \frac{c_0}{2\pi}\sqrt{\frac{S}{lV}}, \quad (1)$$

where f denotes the resonance frequency of the acoustic structure, $c_0$ denotes the speed of sound in air, S denotes a cross-sectional area of the sound guiding tube, l denotes a length of the sound guiding tube, and V denotes a volume of the acoustic cavity.

According to Equation (1), the resonance frequency of the acoustic structure is related to the cross-sectional area of the sound guiding tube in the acoustic structure, the length of the sound guiding tube, and the volume of the acoustic cavity. Specifically, the resonance frequency of the acoustic structure is positively related to the cross-sectional area of the sound guiding tube, and negatively related to the length of the sound guiding tube and/or the volume of the acoustic cavity. The resonance frequency of the acoustic structure may be adjusted by setting structural parameters, such as, the shape of the sound guiding tube, the size of the sound guiding tube, the volume of the acoustic cavity, or the like, or a combination thereof, of the acoustic structure. For example, under a condition that the length of the sound guiding tube and the volume of the acoustic cavity remain unchanged, the cross-sectional area of the sound guiding tube may be reduced by reducing the aperture size of the sound guiding tube, thereby reducing the resonance frequency of the acoustic structure. As another example, under a condition that the cross-sectional area of the sound guiding tube and the length of the sound guiding tube remain unchanged, the resonance frequency of the acoustic structure may be increased by reducing the volume of the acoustic cavity. As a further example, under a condition that the cross-sectional area and length of the sound guiding tube remain unchanged, the resonance frequency of the acoustic structure may be reduced by increasing the volume of the acoustic cavity.

In some embodiments, to improve the response of the microphone to a sound signal in a lower frequency range, the structural parameters of the acoustic structure may be set so that the first resonance frequency $f_1$ is less than the second resonance frequency $f_0$. In some embodiments, to keep the frequency response of the microphone flat in a larger frequency range, the structural parameters of the acoustic structure may be set so that a difference between the first resonance frequency $f_1$ and the second resonance frequency $f_0$ is not less than a frequency threshold. The frequency threshold may be determined according to actual requirements, for example, the frequency threshold may be set as 5 Hz, 10 Hz, 100 Hz, 1000 Hz, and so on. In some embodiments, the first resonance frequency $f_1$ may be greater than or equal to the second resonance frequency $f_0$, so that the sensitivity of the frequency response of the microphone may be improved in different frequency ranges.

In some embodiments, after the sound signal is adjusted by the acoustic structure, the sound signal within a certain frequency band including the first resonance frequency $f_1$ is amplified, so that the sensitivity of the response of the microphone at the first frequency $f_1$ is greater than the sensitivity of the response of the acoustoelectric transducer at the first frequency, thereby improving the sensitivity and Q value of the microphone near the first resonance frequency (e.g., the increase of the sensitivity of the microphone at the frequency $f_1$ may be represented by $\Delta V_1$ in FIG. 4). In some embodiments, by disposing the acoustic structure in the microphone, the sensitivity of the microphone in different frequency ranges may be improved by 5 dBV-40 dBV compared to the sensitivity of the acoustoelectric transducer. In some embodiments, by disposing the acoustic structure in the microphone, the sensitivity of the microphone in different frequency bands may be improved by 10 dBV-20 dBV. In some embodiments, the increment of the sensitivity of the microphone may vary in different frequency ranges. For example, the higher the frequency, the greater the increment of the sensitivity of the microphone in the corresponding frequency band. In some embodiments, the increment of the sensitivity of the microphone may be represented by a slope change of sensitivity in the frequency range. In some embodiments, the slope variation of the sensitivity of the microphone in different frequency ranges may be in the range from 0.0005 dBV/Hz to 0.005 dBV/Hz. In some embodiments, the slope variation of the sensitivity of the microphone in different frequency ranges may be in the range from 0.001 dBV/Hz to 0.003 dBV/Hz. In some embodiments, the slope variation of the sensitivity of the microphone in different frequency ranges may be in the range from 0.002 dBV/Hz to 0.004 dBV/Hz.

In some embodiments, a bandwidth of the frequency response curve of the acoustic structure at the first resonance frequency may be represented by Equation (2):

$$\Delta f = \frac{R'_a}{w_r M'_a} f, \tag{2}$$

where Δf denotes the bandwidth of the frequency response of the acoustic structure, f denotes the resonance frequency of the acoustic structure, $R_a$' denotes a total acoustic resistance of the sound guiding tube (including an acoustic resistance and a radiation resistance of the sound guiding tube), $M_a$' denotes a total sound quality of the sound guiding tube (including a sound quality of the sound guiding tube and a radiated sound quality), and $W_r$ denotes a resonance circular frequency of the acoustic structure.

According to Equation (2), if the resonance frequency of the acoustic structure is determined, the bandwidth of the acoustic structure may be adjusted by adjusting the acoustic resistance of the sound guiding tube. In some embodiments, an acoustic resistance structure may be disposed in the microphone, and the acoustic resistance value of the acoustic resistance structure may be adjusted by adjusting an aperture size, a thickness, a porosity, etc., of the acoustic resistance structure, thereby adjusting the bandwidth of the acoustic structure. For details of the acoustic resistance structure, please refer to FIGS. 10-16 and the descriptions thereof.

In some embodiments, the acoustic resistance of the sound guiding tube may be adjusted by adjusting a roughness of an inner surface of the side wall of the sound guiding tube, thereby adjusting the frequency bandwidth of the frequency response curve of the acoustic structure. In some embodiments, the roughness of the inner surface of the side wall of the sound guiding tube may be less than or equal to 0.8. In some embodiments, the roughness of the inner surface of the side wall of the sound guiding tube may be less than or equal to 0.4. Taking the 3 dB bandwidth of the frequency response curve of the microphone as an example, by adjusting the structural parameters of the acoustic structure, the 3 dB bandwidth of the frequency response curve of the microphone may be 100 Hz-1500 Hz. In some embodiments, by adjusting the roughness of the inner surfaces of the side walls of the sound guiding tubes corresponding to different acoustic structures, the increment of the 3 dB frequency bandwidth of the microphones at different resonance frequencies may be different. For example, by adjusting the roughness of the inner surfaces of the side walls of the sound guiding tubes corresponding to different acoustic structures, the higher the resonance frequency of the acoustic structure, the greater the increase in the 3 dB bandwidth of the microphone at its corresponding resonance frequency. In some embodiments, the increase in the 3 dB bandwidth of the microphone at different resonance frequencies may be represented by a slope change of the bandwidth. In some embodiments, the slope change range of the 3 dB bandwidth of the microphone over the frequency range may be 0.01 Hz/Hz-0.1 Hz/Hz. In some embodiments, the slope change range of the 3 dB bandwidth of the microphone over the frequency range may be 0.05 Hz/Hz-0.1 Hz/Hz. In some embodiments, the slope change range of the 3 dB bandwidth of the microphone over the frequency range may be 0.02 Hz/Hz-0.06 Hz/Hz.

In some embodiments, an amplification factor (also referred to as a gain) of the acoustic structure to a sound pressure of the sound signal may be expressed as Equation (3):

$$A_P = 4\pi\sqrt{\frac{l_0^3 V}{s^3}}, \tag{3}$$

where $A_p$ denotes the amplification factor of the sound pressure, $l_0$ denotes the length of the sound guiding tube, s denotes the cross-sectional area of the sound guiding tube, and V denotes the volume of the acoustic cavity.

According to Equation (3), the amplification factor of the sound pressure of the acoustic structure to the sound signal is related to the length of the sound guiding tube, the cross-sectional area of the sound guiding tube, and the volume of the acoustic cavity. Specifically, the amplification factor of the sound pressure of the acoustic structure to the sound signal is positively correlated with the length of the sound guiding tube and the volume of the acoustic cavity, and negatively correlated with the cross-sectional area of the sound guiding tube.

According to Equation (1), Equation (3) may also be transformed into Equation (4):

$$A_p = \sqrt{\frac{c_0^3}{2\pi^3 R^2 l f^3}}, \tag{4}$$

where $A_p$ denotes the amplification factor of the sound pressure, f denotes the resonance frequency of the acoustic structure, $c_0$ denotes the speed of sound in air, l denotes the length of the sound guide, and R denotes a radius of the acoustic cavity.

It may be seen from Equation (4) that under a situation that other conditions (e.g., the length of the sound guiding tube, the radius of the acoustic cavity, etc.) are determined, the amplification factor $A_p$ of the sound pressure of the acoustic structure to the sound signal is related to the resonance frequency f of the acoustic structure. Specifically, the amplification factor $A_p$ of the sound pressure is negatively correlated with the resonance frequency f of the acoustic structure, and the smaller the resonance frequency f is, the larger the amplification factor $A_p$ of the sound pressure is, and vice versa. That is, the acoustic structure has a relatively larger amplification factor for the sound signal at a relatively low resonance frequency (e.g., a resonance frequency in the middle and low frequency band). By setting the structural parameters of the acoustic structure, the resonance frequency, the frequency bandwidth, the amplification factor of a specific frequency component in the sound signal, the sensitivity increment, the Q value, etc., of the microphone may be adjusted. The structural parameters of the acoustic structure may include a shape of the sound guiding tube, a size of the sound guiding tube, a size of the acoustic cavity, an acoustic resistance of the sound guiding tube or the acoustic cavity, a roughness of the inner surface of a side wall of the sound guiding tube, the thickness of the sound absorbing material in the sound guiding tube, etc., or a combination thereof.

Figure 5:
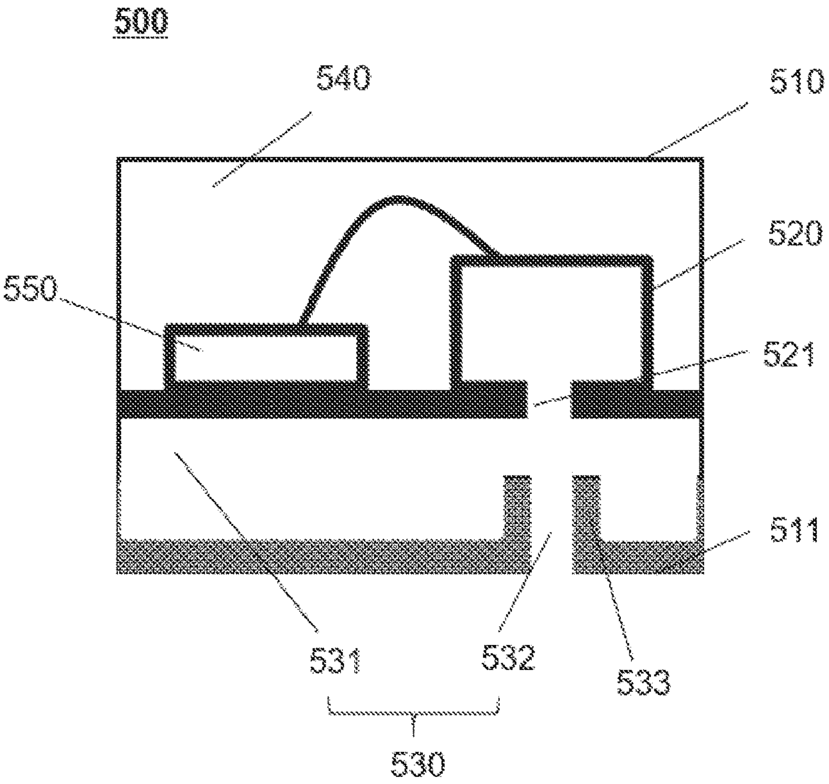
FIG. 5 is a schematic diagram illustrating an exemplary microphone according to some embodiments of the present disclosure.

FIG. 5 is a schematic diagram illustrating an exemplary microphone according to some embodiments of the present disclosure. As shown in FIG. 5, a microphone 500 may include a housing 510, at least one acoustoelectric transducer 520, and an acoustic structure 530. One or more components of the microphone 500 shown in FIG. 5 may be the same as or similar to one or more components of the microphone 200. For example, the housing 510, the acoustoelectric transducer 520, a hole portion 521 of the acoustoelectric transducer 520, an acoustic cavity 540, an application specific integrated circuit 550, etc., of the microphone 500 may be the same as or similar to the housing 210, the acoustoelectric transducer 220, the hole portion 221 of the acoustoelectric transducer 220, the acoustic cavity 240, the application specific integrated circuit 250, etc., of the microphone 200 shown in FIG. 3. What the acoustic structure 530 of the microphone 500 differs from the acoustic structure 230 of the microphone 200 is the shape and/or location of a sound guiding tube 532 in the acoustic structure 530 of the microphone 500.

As shown in FIG. 5, the acoustic structure 530 may include an acoustic cavity 531 and a sound guiding tube 532. The acoustic cavity 531 may be in acoustic communication with the acoustoelectric transducer 520 through the hole portion 521 of the acoustoelectric transducer 520. The acoustic cavity 531 may be in acoustic communication with the outside of the microphone 500 through the sound guiding tube 532. A first end of the sound guiding tube 532 is located on a first side wall 511 of the housing 510, and a second end of the sound guiding tube 532 is located in the acoustic cavity 531. A side wall 533 of the sound guiding tube 532 extends from the first side wall 511 to the inside of the acoustic cavity 531. The external sound signal enters the inside of the sound guiding tube 532 from the first end of the sound guiding tube 532, and is transmitted to the acoustic cavity 531 from the second end of the sound guiding tube 532. By disposing the second end of the sound guiding tube 532 to extend into the acoustic cavity 531, the length of the sound guiding tube 532 and the volume of the acoustic cavity 531 may be increased without additionally increasing the size of the microphone 500. According to Equation (1), by increasing the length of the sound guiding tube 532 and the volume of the acoustic cavity 531 may reduce the resonance frequency of the acoustic structure 530, so that the frequency response curve of the microphone 500 has a resonance peak at a relatively low resonance frequency.

Figure 6:
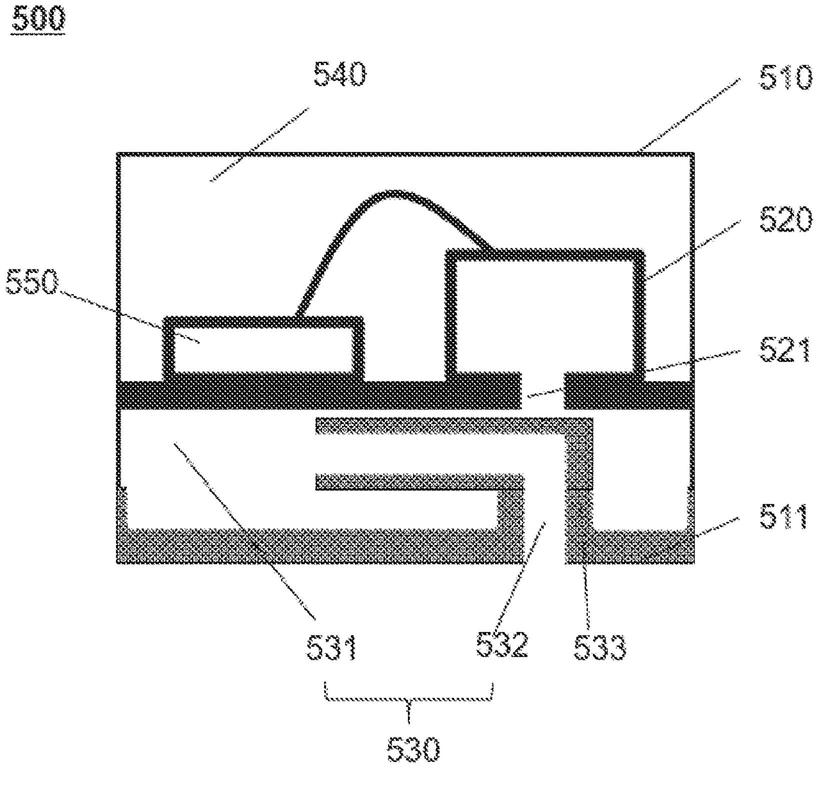
FIG. 6 is a schematic diagram illustrating an exemplary microphone according to some embodiments of the present disclosure.

In some embodiments, the resonance frequency of the acoustic structure 530 may be further adjusted by setting the length, the shape, etc., of the sound guiding tube 532. Merely by way of example, FIG. 6 is a schematic diagram illustrating an exemplary microphone according to some embodiments of the present disclosure. As shown in FIG. 6, the sound guiding tube 532 is a straight curved structure, the first end of the sound guiding tube 532 is located on the first side wall 511 of the housing 510, the second end of the sound guiding tube 532 is located in the acoustic cavity 531, the side wall 533 of the sound guiding tube 532 extends from the first side wall 511 into the inside of the acoustic cavity 531. By disposing the sound guiding tube 532 in a curved shape, the length of the sound guiding tube 532 may be increased while the size of the acoustic cavity 531 is not significantly reduced, so that the resonance frequency of the acoustic structure 530 may be reduced, and the sensitivity and the Q value of the response of the microphone 500 in a relatively low frequency range may be improved. In some embodiments, the structure of the sound guiding tube 532 is not limited to the above-mentioned linear structure (e.g., as shown in FIG. 5), the straight curved structure (e.g., as shown in FIG. 6), and may also be other types of structures, such as, an arc-shaped curved structure designed to reduce the acoustic resistance. In some embodiments, to adjust the acoustic resistance, an included angle between the two segments of the sound guiding tube may be adjusted. For example, the included angle between the center lines of the two segments may be in the range from 60° to 150°. As another example, the included angle between the center lines of the two segments may be in the range from 60° to 90°. As a further example, the included angle between the center lines of the two segments may be in the range from 90° to 120°. As still a further example, the included angle between the center lines of the two segments may be in the range of 120° to 150°.

Figure 7:
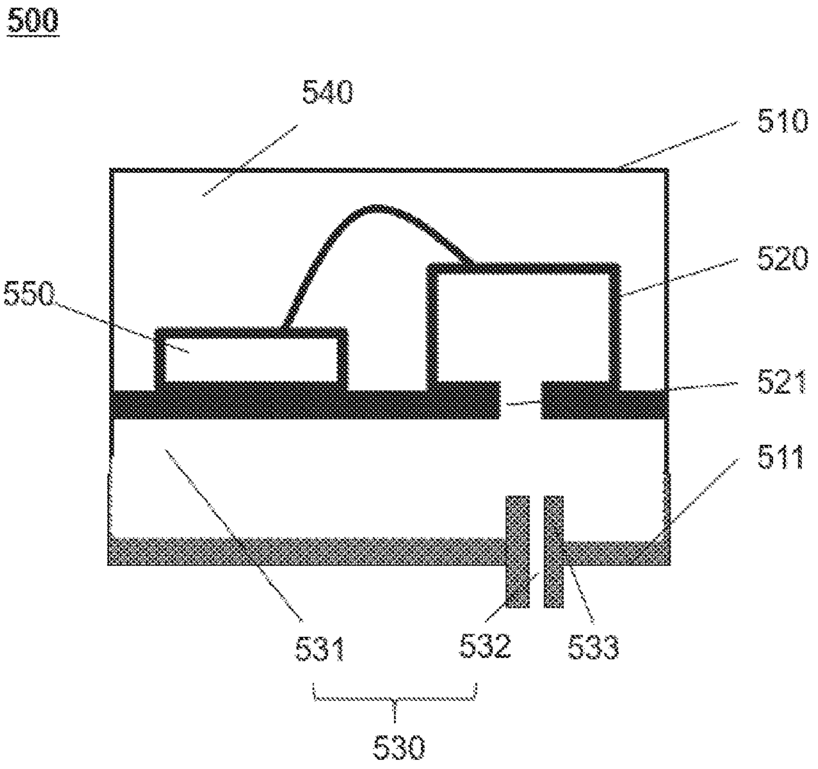
FIG. 7 is a schematic diagram illustrating an exemplary microphone according to some embodiments of the present disclosure.

In some embodiments, the first end of the sound guiding tube 532 may be away from the first side wall 511 and located outside the housing 510, the second end of the sound guiding tube 532 may be located inside of the acoustic cavity 531, and the side wall 533 of the sound guiding tube 532 may extend from the first side wall 511 of the housing 510 to the inside of the acoustic cavity 531. Merely by way of example, FIG. 7 is a schematic diagram illustrating an exemplary microphone according to some embodiments of the present disclosure. As shown in FIG. 7, the sound guiding tube 532 of the microphone 500 penetrates through the first side wall 511 of the housing 510. The first end of the sound guiding tube 532 is away from the first side wall 511, extends to the outside of the housing 510, and is located outside the housing 510. The second end of the sound guiding tube 532 is away from the first side wall 511, extends to the inside of the acoustic cavity 531, and the second end of the sound guiding tube 532 is located in the acoustic cavity 531. The external sound signal may enter the sound guiding tube 532 from the first end of the sound guiding tube 532 and be transmitted to the acoustic cavity 531 from the second end of the sound guiding tube 532.

Figure 8:
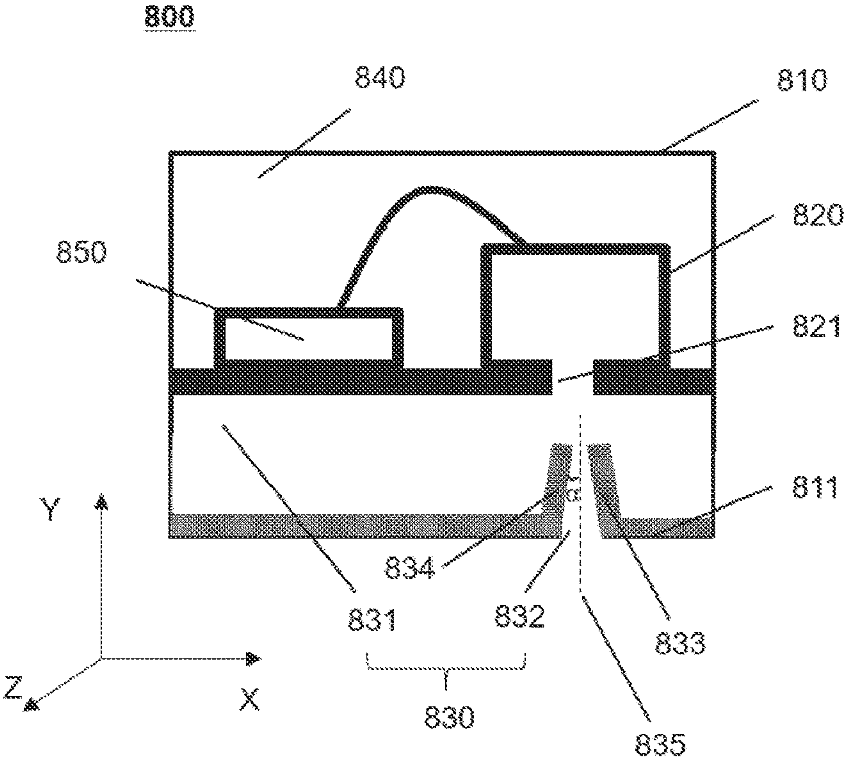
FIG. 8 is a schematic diagram illustrating an exemplary microphone according to some embodiments of the present disclosure.

FIG. 8 is a schematic diagram illustrating an exemplary microphone according to some embodiments of the present disclosure. As shown in FIG. 8, a microphone 800 may include a housing 810, at least one acoustoelectric transducer 820, and an acoustic structure 830. One or more components of the microphone 800 shown in FIG. 8 may be the same as or similar to one or more components of the microphone 500. For example, the housing 810, the acoustoelectric transducer 820, a hole portion 821 of the acoustoelectric transducer 820, an acoustic cavity 840, an application specific integrated circuit 850, etc., of the microphone 800 may be the same as or similar to the housing 510, the acoustoelectric transducer 520, the hole portion 521 of the acoustoelectric transducer 520, the acoustic cavity 540, the application specific integrated circuit 550, etc., of the microphone 500 shown in FIG. 5. What the microphone 800 differs from the microphone 500 is the shape and/or location of a sound guiding tube 832 of the acoustic structure 830.

As shown in FIG. 8, the acoustic structure 830 may include an acoustic cavity 831 and a sound guiding tube 832. The sound guiding tube 832 may include one or more side walls such as a side wall 833 and a side wall 834 to form the sound guiding tube 832. In some embodiments, the side wall 833 and the side wall 834 may be as whole or different parts of the same side wall of the sound guiding tube 832. For example, the side wall 833 and the side wall 834 may be integrally formed. In some embodiments, the side wall 833 and the side wall 834 may be independent structures. In some embodiments, one or more side walls of the sound guiding tube 832 may form a certain inclination angle with a central axis 835 of the sound guiding tube 832. Taking the side wall 833 as an example for description, the side wall 833 of the sound guiding tube 832 and the central axis 835 of the sound guiding tube 832 may form an inclination angle $\alpha$. In some embodiments, as shown in FIG. 8, it is assumed that a direction in which the central axis of the sound guiding tube 832 points to the acoustic cavity 831 is a positive direction. If the aperture size of the sound guiding tube 832 contracts inward along the positive direction of the central axis 835, that is, if the side wall 833 and/or the side wall 834 of the sound guiding tube 832 is moved toward a direction of the center axis 835 along the positive direction of the center axis 835 of the sound guiding tube 832, an angle value of the inclination angle $\alpha$ may be any value between 0° and 90°. For example, the angle value of the inclination angle $\alpha$ may be any value between 0° and 30°. As another example, the angle value of the inclination angle $\alpha$ may be any value between 30° and 45°. As a further example, the angle value of the inclination angle $\alpha$ may be any value between 45° and 60°. As still a further example, the angle value of the inclination angle $\alpha$ may be any value between 60° and 90°.

Figure 9:
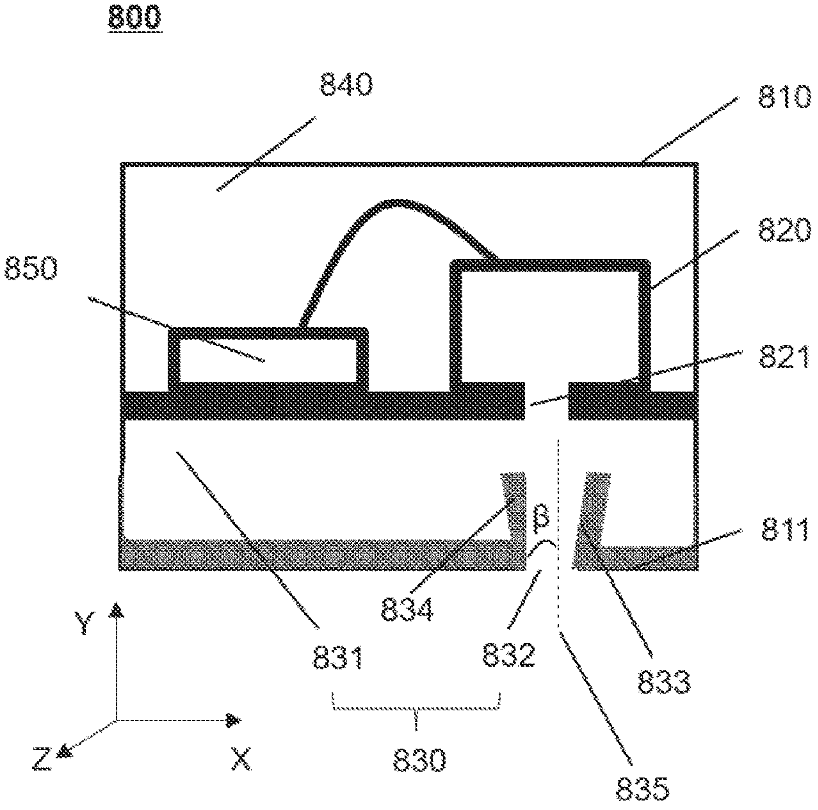
FIG. 9 is a schematic diagram illustrating an exemplary microphone according to some embodiments of the present disclosure.

In some embodiments, as shown in FIG. 9, if the aperture size of the sound guiding tube 832 expands outward along the positive direction of the central axis 835, that is, if the side wall 833 and/or the side wall 834 of the sound guiding tube 832 extends along the positive direction of the central axis 835 of the sound guiding tube 832 to a direction away from the central axis 835, an angle value of the inclination angle $\beta$ formed by the side wall of the sound guiding tube 832 (e.g., the side wall 833 and/or the side wall 834 of the sound guiding tube) and the central axis 835 of the sound guiding tube may be any value between 0° and 90°. For example, the angle value of the inclination angle $\beta$ may be any value between 0° and 10°. As another example, the angle value of the inclination angle $\beta$ may be any value between 10° and 20°. As still an example, the angle value of the inclination angle $\beta$ may be any value between 0° and 30°. As still another example, the angle value of the inclination angle $\beta$ may be any value between 30° and 45°. As a further example, the angle value of the inclination angle $\beta$ may be any value between 45° and 60°. As still a further example, the angle value of the inclination angle $\beta$ may be any value between 60° and 90°.

By setting a certain inclination angle between the side wall of the sound guiding tube 832 and the central axis of the sound guiding tube 832, the location of the resonance frequency of the microphone 800 may be adjusted under a condition that the length of the sound guiding tube 832 and the outer diameter of the first end of the sound guiding tube 832 (e.g., on the first side wall 811 of the housing 810 or an end away from the first side wall 811 and located outside of the microphone 800) remain unchanged. For example, if the aperture size of the sound guiding tube 832 contracts inward along the positive direction of the central axis 835, the size of a cross section of the second end (e.g., an end extending into the acoustic cavity 831) of the sound guiding tube 832 may be reduced without changing the length of the sound guiding tube 832 and the aperture size of the first end of the sound guiding tube 832, thereby reducing the resonance frequency of the acoustic structure 830. As another example, if the aperture size of the sound guiding tube 832 expands outward along the positive direction of the central axis 835, the size of the cross section of the second end of the acoustic tube 832 may be increased without changing the length of the sound guiding tube 832 and the aperture size of the first end of the sound guiding tube 832, thereby increasing the resonance frequency of the acoustic structure 830.

In some embodiments, if a cross section of the acoustic cavity 831 (e.g., a cross section parallel to the XZ plane) is circular, the aperture size of the first end of the sound guiding tube 832 may be no greater than 1.5 times the length of the sound guiding tube 832. In some embodiments, the aperture size of the first end of the sound guiding tube 832 may be in the range from 0.1 mm to 3 mm, and the length of the sound guiding tube 832 may be in the range from 1 mm to 4 mm. In some embodiments, the aperture size of the first end of the sound guiding tube 832 may be in the range from 0.1 mm to 2 mm, and the length of the sound guiding tube 832 may be in the range from 1 mm to 3 mm.

Figure 10:
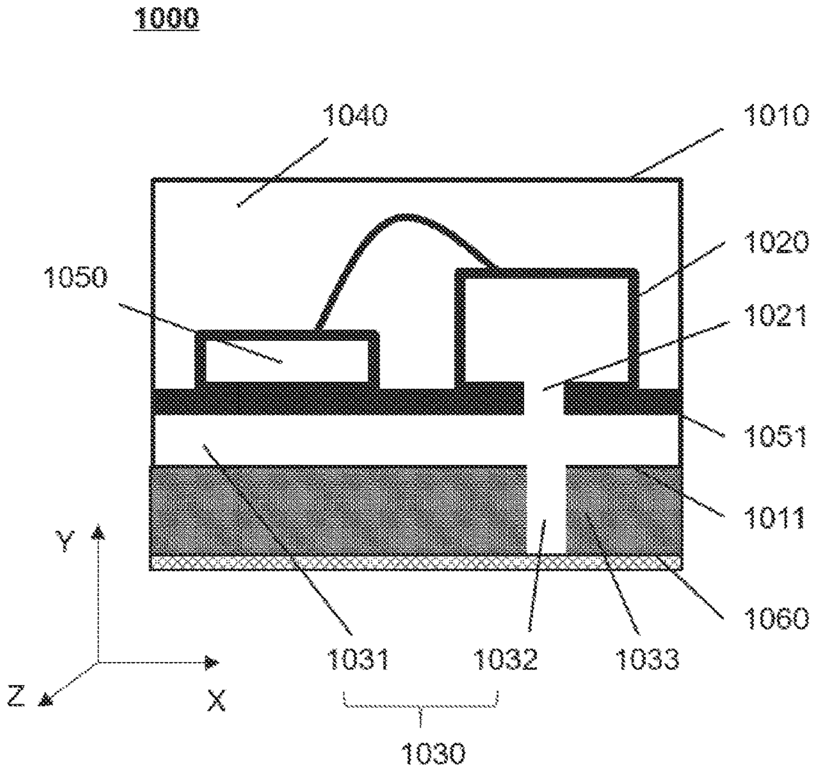
FIG. 10 is a schematic diagram illustrating an exemplary microphone according to some embodiments of the present disclosure.

FIG. 10 is a schematic diagram illustrating an exemplary microphone according to some embodiments of the present disclosure. As shown in FIG. 10, a microphone 1000 may include a housing 1010, at least one acoustoelectric transducer 1020, and an acoustic structure 1030. One or more components of the microphone 1000 shown in FIG. 10 may be the same as or similar to one or more components of the microphone 200 shown in FIG. 2A. For example, the housing 1010, the acoustoelectric transducer 1020, a hole portion 1021 of the acoustoelectric transducer 1020, an acoustic cavity 1040, an application specific integrated circuit 1050, etc., of the microphone 1000 may be the same as or similar to the housing 210, the acoustoelectric transducer 220, the hole portion 221 of the acoustoelectric transducer 220, the acoustic structure 230, the acoustic cavity 240, etc., of the microphone 200 shown in FIG. 3.

In some embodiments, a difference between the microphone 1000 and the microphone 200 is that the microphone 1000 may further include an acoustic resistance structure 1060. According to Equation (2), the acoustic resistance structure 1060 may be used to adjust the frequency bandwidth of the acoustic structure 1030. In some embodiments, the acoustic resistance structure 1060 may include a membrane-like acoustic resistance structure, a mesh-like acoustic resistance structure, a plate-like acoustic resistance structure, or the like, or a combination thereof. In some embodiments, the acoustic resistance structure 1060 may include a single-layer damping structure, a multi-layer damping structure, etc., or other damping structures. The multi-layer damping structure may include a single multi-layer damping structure or a damping structure composed of a plurality of single-layer damping structures.

In some embodiments, the acoustic resistance structure 1060 may be disposed on an outer surface of a side wall 1033 forming the sound guiding tube 1032 away from a first side wall 1011 of the housing 1010, a position inside of the sound guiding tube 1032, an inner surface of the first side wall 1011, the outer surface of the first side wall 1011, a position inside the acoustic cavity 1031, an inner surface of a second side wall 1051 for forming the hole portion 1021 of the acoustoelectric transducer 1020, the outer surface of the second side wall 1051, a position inside the hole portion 1021 of the acoustoelectric transducer 1020, or the like, or a combination thereof.

As shown in FIG. 10, the acoustic resistance structure 1060 may be disposed in a form of a single-layer damping structure on the outer surface of the side wall 1033 forming the sound guiding tube 1032 away from the first side wall 1011. The material, the size, the thickness, etc., of the acoustic resistance structure 1060 may be set according to actual requirements. For example, the length of the acoustic resistance structure 1060 along the X-axis direction may be equal to a sum of lengths of the sound guiding tube 1032 and the side wall 1033 of the sound guiding tube 1032. As another example, the length of the acoustic resistance structure 1060 along the X-axis direction may be equal to or greater than the aperture size of the sound guiding tube 1032. As still an example, the width of the acoustic resistance structure 1060 along the Z-axis direction may be equal to or greater than the width of the side wall 1033 of the sound guiding tube 1032.

Figure 11:
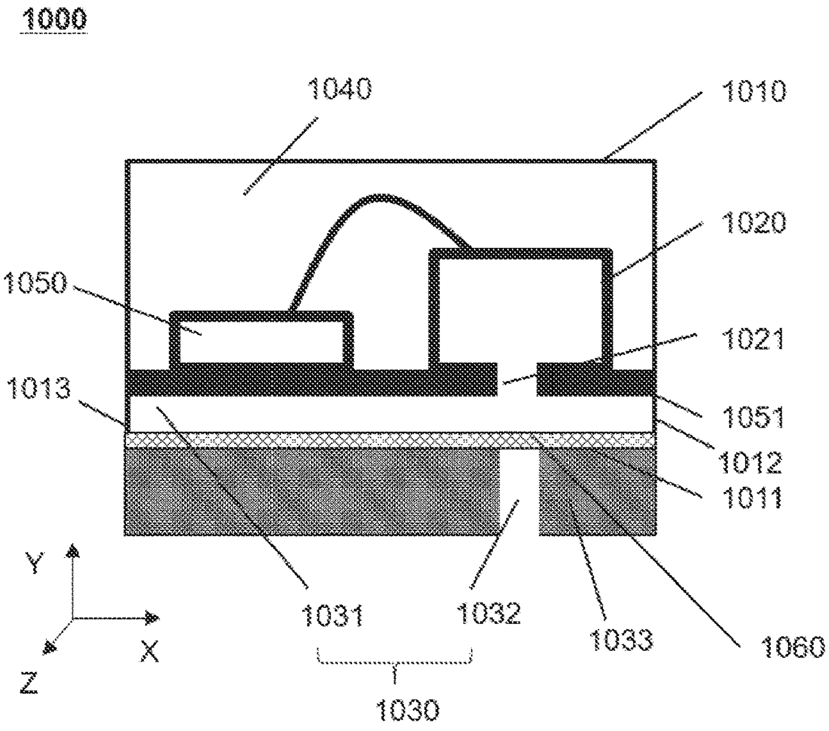
FIG. 11 is a schematic diagram illustrating an exemplary microphone according to some embodiments of the present disclosure.

As shown in FIG. 11, the acoustic resistance structure 1060 may be disposed on the inner surface of the first side wall 1011 in a form of a single-layer damping structure. In some embodiments, the acoustic resistance structure 1060 may be connected to one or more side walls of the housing 1010 (e.g., the side wall 1011, the side wall 1012, the side wall 1013, etc., of the housing 1010). The material, the size, the thickness, etc., of the acoustic resistance structure 1060 may be set according to actual requirements. For example, the length of the acoustic resistance structure 1060 along the X-axis direction may be less than or equal to the length of the side wall 1011 of the housing 1010 along the X-axis direction. As another example, the width of the acoustic resistance structure 1060 along the Z-axis direction may be less than or equal to the width of the side wall 1011 of the housing 1010 along the Z-axis direction. As still an example, the size of the acoustic resistance structure 1060 may be greater than, equal to or less than the aperture size of the sound guiding tube 1032.

Figure 12:
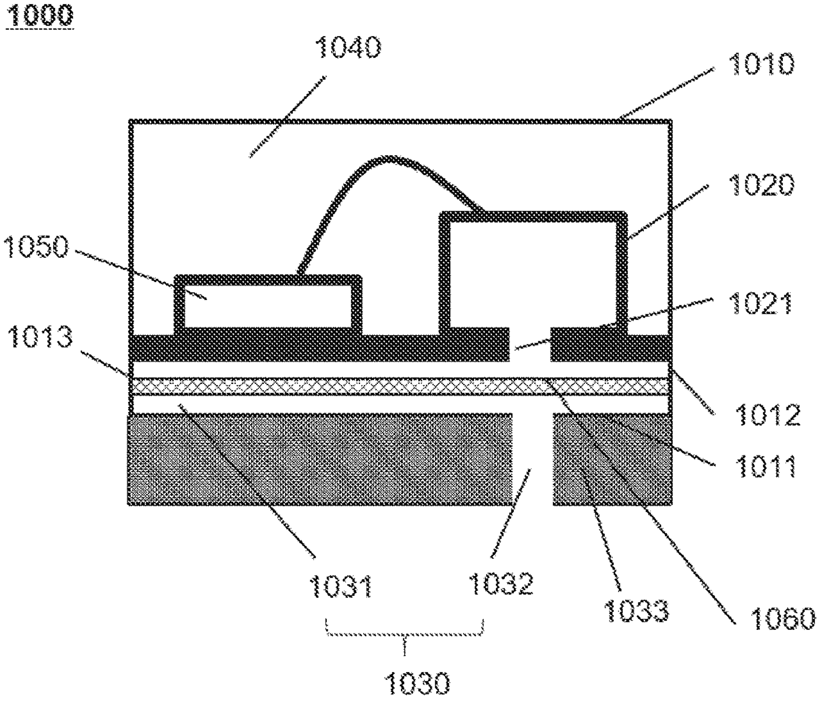
FIG. 12 is a schematic diagram illustrating an exemplary microphone according to some embodiments of the present disclosure.
Figure 13:
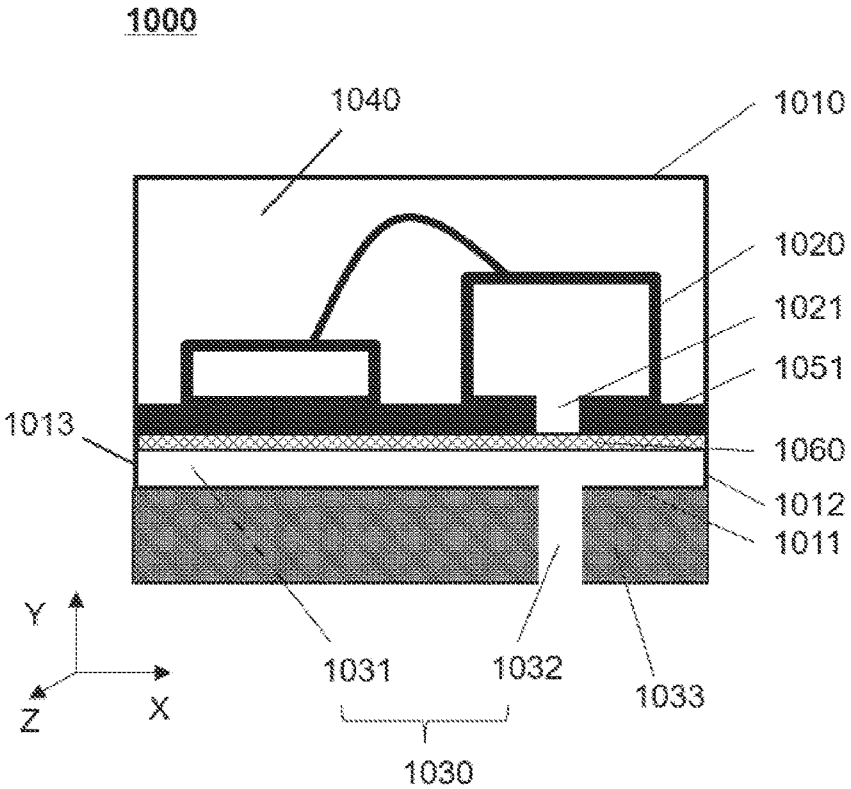
FIG. 13 is a schematic diagram illustrating an exemplary microphone according to some embodiments of the present disclosure.

As shown in FIG. 12, the acoustic resistance structure 1060 may be disposed in the acoustic cavity 1031 in a form of a single-layer damping structure, which may or may not be connected with the side wall forming the sound guiding tube 1032. For example, both ends of the acoustic resistance structure 1060 may be connected to the side wall 1011 and/or the side wall 1013 of the housing 1010, respectively. As shown in FIG. 13, the acoustic resistance structure 1060 may be disposed on the outer surface of the second side wall 1051 configured to form the hole portion 1021 of the acoustoelectric transducer 1020 in the form of a single-layer damping structure, which may be or may not be physically connected with the second side wall 1051. For example, two ends of the acoustic resistance structure 1060 may be connected to the side wall 1012 and the side wall 1013 of the housing 1010, respectively. As another example, the acoustic resistance structure 1060 may be physically connected to the second side wall 1051. In some embodiments, the size of the acoustic resistance structure 1060 may be the same as or different from the size of the second side wall 1051. For example, the length of the acoustic resistance structure 1060 along the X-axis direction may be greater than, equal to, or less than a sum of the length of the second side wall 1051 along the X-axis and the aperture size of the hole portion 1021. In some embodiments, the size of the acoustic resistance structure 1060 may be greater than the size of the hole portion 1021 of the acoustoelectric transducer 1020.

Figure 14:
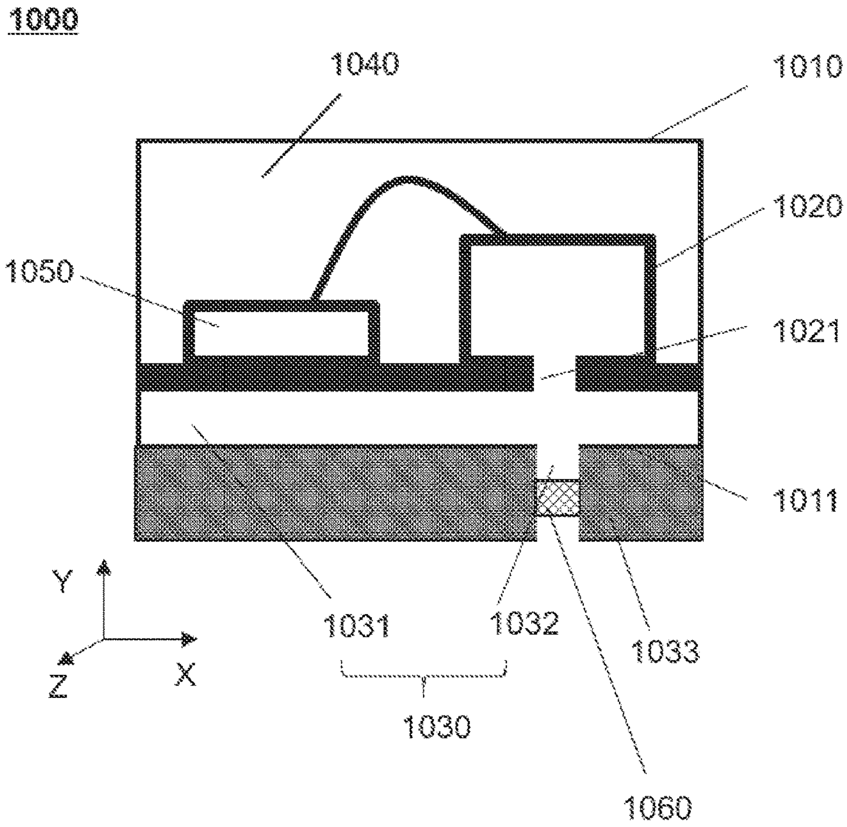
FIG. 14 is a schematic diagram illustrating an exemplary microphone according to some embodiments of the present disclosure.

As shown in FIG. 14, the acoustic resistance structure 1060 may be disposed inside the sound guiding tube 1032 in a form of a single-layer damping structure. The acoustic resistance structure 1060 may be connected to the side wall 1033 of the sound guiding tube in whole or in part. In some embodiments, the material, the size, the thickness, etc., of the acoustic resistance structure 1060 may be set according to actual requirements. For example, the thickness of the acoustic resistance structure 1060 along the Y-axis direction may be greater than, equal to, or less than the length of the sound guiding tube 1032 along the Y-axis direction. As another example, the length of the acoustic resistance structure 1060 along the X-axis direction may be greater than, equal to, or less than the aperture size of the sound guiding tube 1032.

Figure 15:
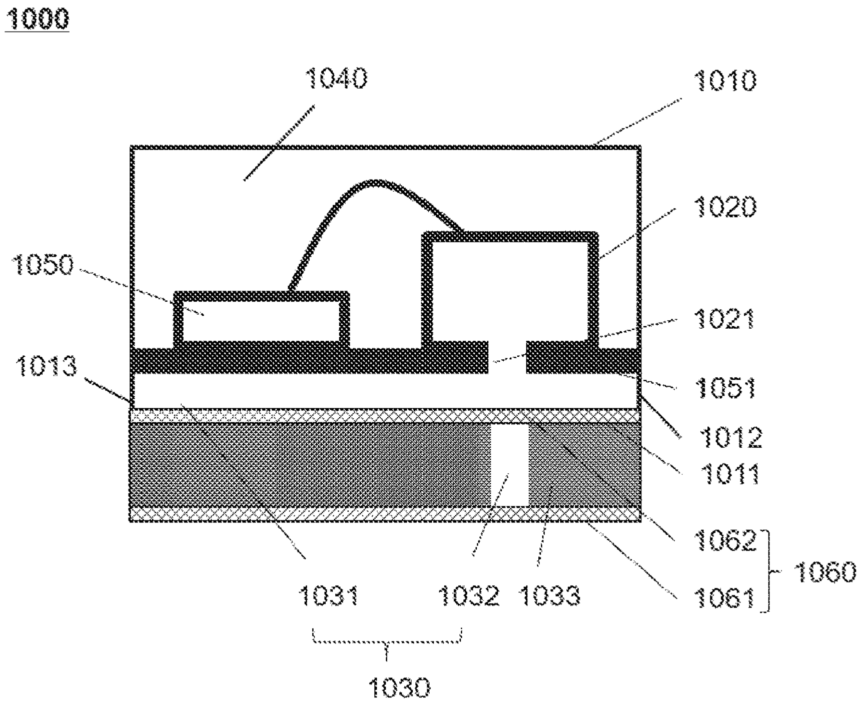
FIG. 15 is a schematic diagram illustrating an exemplary microphone according to some embodiments of the present disclosure.

FIG. 15 is a schematic diagram illustrating an exemplary microphone according to some embodiments of the present disclosure. As shown in FIG. 15, the acoustic resistance structure 1060 may include a double-layer damping structure, and the double-layer damping structure may include a first acoustic resistance structure 1061 and a second acoustic resistance structure 1062. The first acoustic resistance structure 1061 may be disposed on the outer surface of the side wall 1033 forming the sound guiding tube 1032 away from the first side wall 1011 of the housing 1010, and may be or may not be physically connected to the outer surface of the first side wall 1011. The second acoustic resistance structure 1062 may be disposed on the inner surface of the first side wall 1011, and may be or may not be physically connected to the inner surface of the first side wall 1011. In some embodiments, the position, the size, the material, etc., of the first acoustic resistance structure 1061 and the second acoustic resistance structure 1062 may be set according to actual requirements, and may be the same or different. For example, the first acoustic resistance structure 1061 and/or the second acoustic resistance structure 1062 may be disposed in the acoustic cavity 1031 (e.g., physically connected to the second side wall 1051, the first side wall 1011, the side wall 1012, the side wall 1013, etc.). As another example, the first acoustic resistance structure 1061 and/or the second acoustic resistance structure 1062 may be disposed in the hole portion 1021 of the acoustoelectric transducer 1020. As a further another example, the first acoustic resistance structure 1061 and/or the second acoustic resistance structure 1062 may be disposed in the sound guiding tube 1032. As still another example, the first acoustic resistance structure 1061 and/or the second acoustic resistance structure 1062 may be disposed on the outer surface of the side wall 1033 of the sound guiding tube 1032.

In some embodiments, an acoustic resistance value of the acoustic resistance structure 1060 may be changed by adjusting the parameters of the acoustic resistance structure 1060. In some embodiments, the parameters of the acoustic resistance structure 1060 may include, but are not limited to, the thickness, the diameter, the porosity, etc., of the acoustic resistance structure 1060. In some embodiments, the thickness of the acoustic resistance structure 1060 may be 20 μm-300 μm. In some embodiments, the acoustic resistance structure 1060 may have a thickness in a range from 10 μm to 400 μm. In some embodiments, the aperture size of the acoustic resistance structure 1060 may be 20 μm-300 μm. In some embodiments, the aperture size of the acoustic resistance structure 1060 may be 30 μm-300 μm. In some embodiments, the aperture size of the acoustic resistance structure 1060 may be 10 μm-400 μm. In some embodiments, the porosity of the acoustic resistance structure 1060 may be 10%-50%. In some embodiments, the porosity of the acoustic resistance structure 1060 may be 30%-50%. In some embodiments, the porosity of the acoustic resistance structure 1060 may be 20%-40%. In some embodiments, the porosity of the acoustic resistance structure 1060 may be 25%-45%. In some embodiments, the acoustic resistance value of the acoustic resistance structure 1060 may be in the range from 1 MKS Rayls to 100 MKS Rayls. In some embodiments, by adjusting the parameters of the acoustic resistance structure 1060 (e.g., the diameter, the thickness, the porosity, etc.), the acoustic resistance value of the acoustic resistance structure 1060 may be set to be 10 MKS Rayls-90 MKS Rayls, 20 MKS Rayls-80 MKS Rayls, 30 MKS Rayls-70 MKS Rayls, 40 MKS Rayls-60 MKS Rayls, 50 MKS Rayls.

Figure 16:
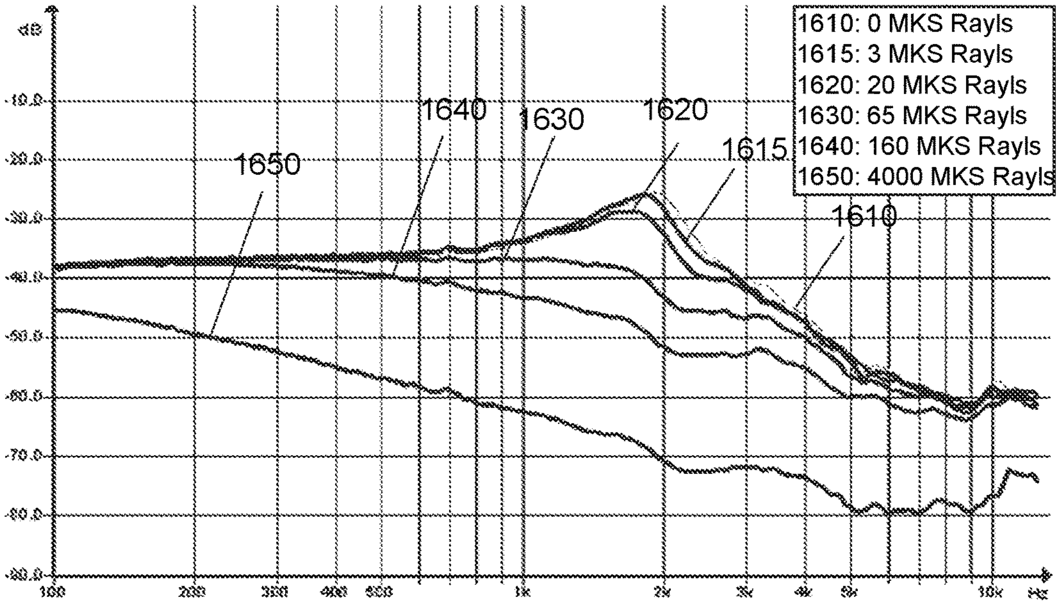
FIG. 16 is a schematic diagram illustrating a frequency response curve of an exemplary microphone according to some embodiments of the present disclosure.

In some embodiments, by disposing the acoustic resistance structure in the microphone, the acoustic resistance of the acoustic structure of the microphone may be increased, thereby adjusting the bandwidth (3 dB) and/or the Q value of the frequency response of the microphone. In some embodiments, the acoustic resistance structures with different acoustic resistance values may have different degrees of influence on the Q value of the frequency response of the microphone. FIG. 16 is a schematic diagram illustrating a frequency response curve of an exemplary microphone according to some embodiments of the present disclosure. As shown in FIG. 16, the horizontal axis represents the frequency, in Hz, and the vertical axis represents the frequency response of the microphone, in dB. A curve 1610 represents the frequency response of a microphone without an acoustic resistance structure. A curve 1615 represents the frequency response of a microphone with an acoustic resistance structure with an acoustic resistance value of 3 MKS Rayls. A curve 1620 represents a microphone with an acoustic resistance structure with an acoustic resistance value of 20 MKS Rayls. A curve 1630 represents the frequency response of a microphone with an acoustic resistance structure with an acoustic resistance value of 65 MKS Rayls. A curve 1640 represents the frequency response of a microphone with an acoustic resistance structure with an acoustic resistance value of 160 MKS Rayls. A curve 1650 represents the frequency response of a microphone with an acoustic resistance structure with an acoustic resistance value of 4000 MKS Rayls. It may be seen from FIG. 16 that as the acoustic resistance value of the acoustic resistance structure increases, the bandwidth of the frequency response curve of the microphone increases, and the frequency response of the microphone decreases. Therefore, the Q value of the microphone may be adjusted by setting the acoustic resistance value of the acoustic resistance structure of the microphone. In some embodiments, as the acoustic resistance value of the acoustic resistance structure increases, the Q value of the microphone may decrease. Therefore, the acoustic resistance value of the acoustic resistance structure may be selected according to actual requirements to obtain a target Q value and a target frequency bandwidth of the microphone. For example, the acoustic resistance value of the acoustic resistance structure may be set to be no greater than 20 MKS Rayls, and the corresponding target frequency bandwidth (3 dB) is no less than 300 Hz. As another example, the acoustic resistance value of the acoustic resistance structure may be no greater than 100 MKS Rayls, and the corresponding target frequency bandwidth (3 dB) is no less than 1000 Hz.

Figure 17:
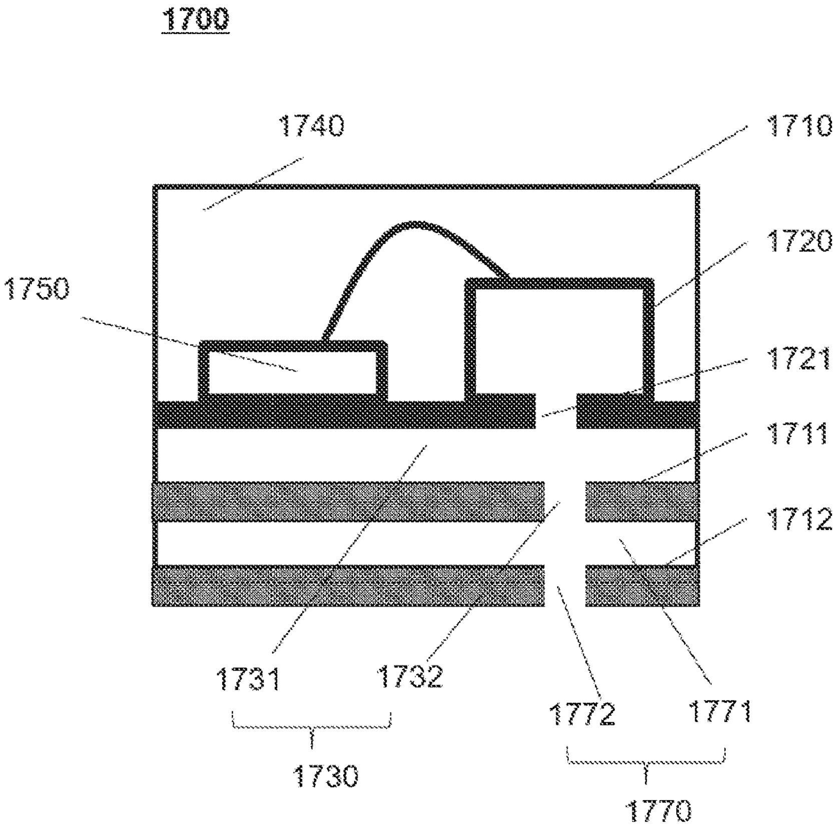
FIG. 17 is a schematic diagram illustrating an exemplary microphone according to some embodiments of the present disclosure.

FIG. 17 is a schematic diagram illustrating an exemplary microphone according to some embodiments of the present disclosure. As shown in FIG. 17, a microphone 1700 may include a housing 1710, at least one acoustoelectric transducer 1720, an acoustic structure 1730, an acoustic cavity 1740, and an acoustic structure 1770 (also referred to a second acoustic structure). One or more components of the microphone 1700 shown in FIG. 17 may be the same as or similar to one or more components of the microphone 200 shown in FIG. 3. For example, the housing 1710, the acoustoelectric transducer 1720, the acoustic structure 1730, the acoustic cavity 1740, an application specific integrated circuit 1750, etc., of the microphone 1700 may be the same as or similar to the housing 210, the at least one acoustoelectric transducer 220, the acoustic structure 230, the acoustic cavity 240, the application specific integrated circuit 250, etc., of the microphone 200 shown in FIG. 3. The difference between the microphone 1700 and the microphone 200 is that the microphone 1700 may further include the second acoustic structure 1770. In some embodiments, the second acoustic structure 1770 may be disposed in series with the acoustic structure 1730. The second acoustic structure 1770 may be disposed in series with the acoustic structure 1730 means that a second acoustic cavity 1771 of the second acoustic structure 1770 may be in acoustic communication with an acoustic cavity 1731 of the acoustic structure 1730 through a sound guiding tube 1732 of the acoustic structure 1730. In some embodiments, the second acoustic cavity 1771 of the second acoustic structure 1770 is in acoustic communication with the outside of the microphone 1700 through a second sound guiding tube 1772. In some embodiments, the sound guiding tube 1732 may be disposed on the side wall 1711 forming the acoustic cavity 1731, and the second sound guiding tube 1772 may be disposed on a side wall 1712 forming the second acoustic cavity 1771.

In some embodiments, the external sound signal picked up by the microphone 1700 may be first adjusted (e.g., filtered) by the second acoustic structure 1770, and then transmitted to the acoustic structure 1730 through the sound guiding tube 1732, and the acoustic structure 1730 may adjust the sound signal again. The sound signal after the secondary adjustment further enters the acoustic cavity 1740 of the microphone 1700 through a hole portion 1721, thereby generating an electrical signal.

In some embodiments, structural parameters of the second acoustic structure 1770 are the same as or different from structural parameters of the acoustic structure 1730. For example, the shape of the acoustic structure 1770 may be a cylinder, and the shape of the acoustic structure 1730 may be a cylinder. As another example, the acoustic resistance value of the acoustic structure 1770 may be less than the acoustic resistance value of the acoustic structure 1730. For more descriptions about the setting of the structural parameters of the acoustic structure 1730 and/or the acoustic structure 1770, please refer to FIG. 2A, FIG. 3, FIGS. 5-15 and related descriptions.

In some embodiments, the second acoustic structure 1770 may have a resonance frequency (which may also be referred to as a third resonance frequency). A frequency component of the sound signal at the third resonance frequency may resonate, so that the second acoustic structure 1770 may amplify the frequency component of the sound signal near the third resonance frequency. The acoustic structure 1730 may have a first resonance frequency. The frequency component of the sound signal amplified by the second acoustic structure 1770 may resonate at the first resonance frequency, so that the acoustic structure 1730 may continue to amplify the frequency component of the sound signal near the first resonance frequency. Considering that a specific acoustic structure only has a good amplifying effect on a sound component in a specific frequency range, for the convenience of understanding, the sound signal amplified by the acoustic structure may be regarded as a sub-band sound signal at the corresponding resonance frequency of the acoustic structure. For example, the above-mentioned sound signal amplified by the second acoustic structure 1770 may be regarded as a sub-band sound signal at the third resonance frequency, and the sound signal further amplified by the acoustic structure 1730 may generate another sub-band sound signal at the first resonance frequency. The amplified sound signal is transmitted to the acoustoelectric transducer 1720, thereby generating a corresponding electrical signal. In this way, the acoustic structure 1730 and the second acoustic structure 1770 may respectively increase the Q value of the microphone 1700 in frequency bands including the first resonance frequency and the third resonance frequency, thereby improving the sensitivity of the microphone 1700. In some embodiments, at different resonance frequencies, the increment of the sensitivity of the microphone 1700 (relative to the acoustic transducer) may be the same or different. For example, if the third resonance frequency is greater than the first resonance frequency, the sensitivity of the response of the microphone 1700 at the third resonance frequency is greater than the sensitivity of the response of the microphone 1700 at the first resonance frequency. In some embodiments, the resonance frequency of the acoustic structure 1770 and/or the acoustic structure 1730 may be adjusted by adjusting structural parameters of the acoustic structure 1770 and/or the acoustic structure 1730. In some embodiments, the first resonance frequency corresponding to the acoustic structure 1730 and the third resonance frequency corresponding to the second acoustic structure 1770 may be set according to actual conditions. For example, both the first resonance frequency and the third resonance frequency may be less than the second resonance frequency, so that the sensitivity of the microphone 1700 in the middle and low frequency bands may be improved. As another example, the absolute value of the difference between the first resonance frequency and the third resonance frequency may be less than a frequency threshold (e.g., 100 Hz, 200 Hz, 1000 Hz, etc.), so that the sensitivity and Q value of the microphone 1700 may be improved within a certain frequency range. As still a further example, the first resonance frequency may be greater than the second resonance frequency, and the third resonance frequency may be less than the second resonance frequency, so that the frequency response curve of the microphone 1700 may be flatter and the sensitivity of the microphone 1700 in a relatively wide frequency band may be improved.

The foregoing description of the microphone 1700 is for illustrative purposes only and is not intended to limit the scope of the present disclosure. For those of ordinary skill in the art, various changes and modifications may be made based on the description of the present disclosure. In some embodiments, the microphone 1700 may include multiple (e.g., 3, 5, 11, 14, 64, etc.) acoustic structures. In some embodiments, the acoustic structures in the microphone may be connected in series, in parallel, or a combination thereof. In some embodiments, the magnitudes of the first resonance frequency, the second resonance frequency, and the third resonance frequency may be adjusted according to actual requirements. For example, the first resonance frequency and/or the third resonance frequency may be less than, equal to, or greater than the second resonance frequency. As another example, the first resonance frequency may be less than, equal to, or greater than the third resonance frequency. These changes and modifications are still within the protection scope of the present disclosure.

Figure 18:
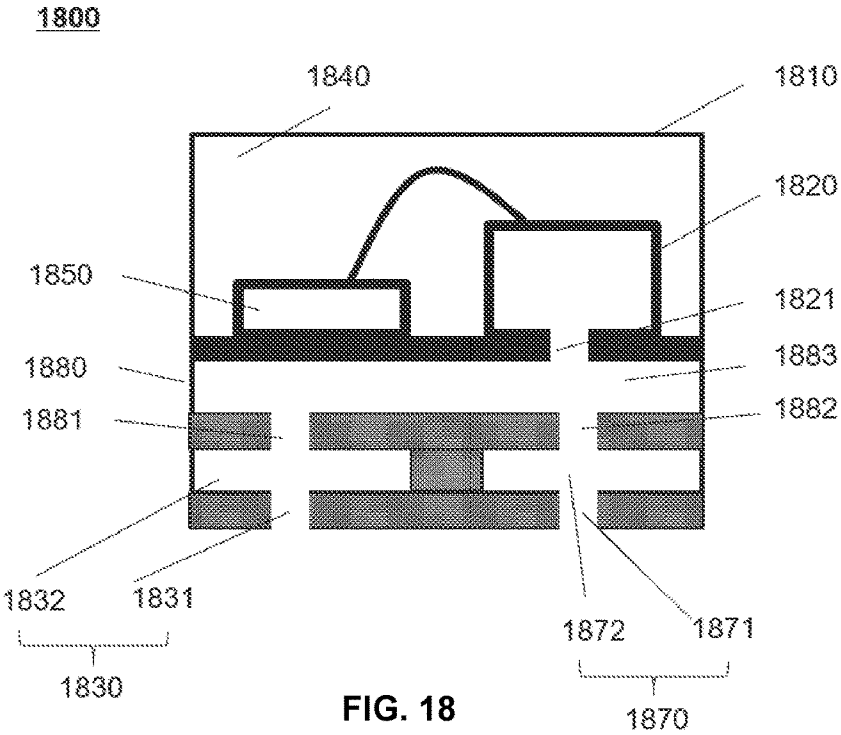
FIG. 18 is a schematic diagram illustrating an exemplary microphone according to some embodiments of the present disclosure.

FIG. 18 is a schematic diagram illustrating an exemplary microphone according to some embodiments of the present disclosure. As shown in FIG. 18, a microphone 1800 may include a housing 1810, at least one acoustoelectric transducer 1820, an acoustic structure 1830, a second acoustic structure 1870, and a third acoustic structure 1880.

In some embodiments, the housing 1810 may be used to accommodate one or more components of the microphone 1800 (e.g., the acoustoelectric transducer 1820, the acoustic structure 1830, and at least part of the second acoustic structure 1870 and/or the third acoustic structure 1880). One or more components in the microphone 1800 may be the same as or similar to one or more components in the microphone 1700 shown in FIG. 17. For example, the housing 1810, the at least one acoustoelectric transducer 1820, the acoustic structure 1830, the acoustic cavity 1840, the application specific integrated circuit 1850, etc., may be the same as or similar to the housing 1710, the at least one acoustoelectric transducer 1720, the acoustic structure 1730, the acoustic cavity 1740, and the application specific integrated circuit 1750 shown in FIG. 17. The difference between the microphone 1800 and the microphone 1700 is that a count of acoustic structures included in the microphone 1800 and a connection manner, etc., may be different from those of the microphone 1700.

In some embodiments, the housing 1810 may be an internally hollow structure, which may form one or more acoustic cavities, for example, the acoustic cavity 1840, the acoustic structure 1830, the second acoustic structure 1870, the third acoustic structure 1880, etc. In some embodiments, the acoustoelectric transducer 1820 may be disposed in the acoustic cavity 1840. In some embodiments, the acoustoelectric transducer 1820 may include a hole portion 1821. The third acoustic structure 1880 may be in acoustic communication with the acoustoelectric transducer 1820 through the hole portion 1821. In some embodiments, the acoustic structure 1830 may include a sound guiding tube 1831 and an acoustic cavity 1832, the second acoustic structure 1870 may include a second sound guiding tube 1871 and a second acoustic cavity 1872, the third acoustic structure 1880 may include a third sound guiding tube 1881, a fourth sound guiding tube 1882 and a third acoustic cavity 1883. The acoustic cavity 1832 may be in acoustic communication with the third acoustic cavity 1883 through the third sound guiding tube 1881. The acoustic cavity 1832 may be in acoustic communication with the outside of the acoustic microphone 1800 through the sound guiding tube 1831. The second acoustic cavity 1872 may be in acoustic communication with the third acoustic cavity 1883 through the fourth sound guiding tube 1882. The second acoustic cavity 1872 may be in acoustic communication with the outside of the acoustic microphone 1800 through the second sound guiding tube 1871. The third acoustic cavity 1883 may be in acoustic communication with the acoustoelectric transducer 1820 through the hole portion 1821 of the acoustoelectric transducer 1820.

In some embodiments, the acoustic structure 1830 has a first resonance frequency, the acoustoelectric transducer 1820 has a second resonance frequency, the second acoustic structure 1870 has a third resonance frequency, and the third acoustic structure 1880 has a fourth resonance frequency. In some embodiments, the first resonance frequency, the third resonance frequency, and/or the fourth resonance frequency may be the same as or different from the second resonance frequency. In some embodiments, the first resonance frequency, the third resonance frequency, and/or the fourth resonance frequency may be the same or different. For example, the first resonance frequency may be greater than 10000 Hz, the second resonance frequency may be in the range from 500 Hz to 700 Hz, the third resonance frequency may be in the range from 700 Hz to 1000 Hz, and the fourth resonance frequency may be in the range from 1000 Hz to 1300 Hz, thereby the sensitivity of the microphone 1800 in a relatively wide frequency band may be improved. As another example, the first resonance frequency, the third resonance frequency, and the fourth resonance frequency may be less than the second resonance frequency, so that the frequency response and the sensitivity of the microphone 1800 in the middle and low frequency bands may be improved. As still an example, one part of the first resonance frequency, the third resonance frequency, and the fourth resonance frequency may be less than the second resonance frequency, and another part of the resonance frequencies may be greater than the second resonance frequency, so that the sensitivity of the microphone 1800 in a relatively wide frequency band may be improved. As still another example, the first resonance frequency, the third resonance frequency, and the fourth resonance frequency may be located in a specific frequency range, so that the sensitivity and the Q value of the microphone 1800 in the specific range may be improved.

When using the microphone 1800 for processing the sound signal, the sound signal may enter the acoustic cavity 1832 of the acoustic structure 1830 through the sound guiding tube 1831 and/or enter the second acoustic cavity 1872 of the second acoustic structure 1870 through the second sound guiding tube 1871. The acoustic structure 1830 may adjust the sound signal to generate a first sub-band sound signal having a first resonance peak at a first resonance frequency. Similarly, the second acoustic structure 1870 may adjust the sound signal to generate a second sub-band sound signal having a second resonance peak at the third resonance frequency. The first sub-band sound signal and/or the second sub-band sound signal generated after being adjusted by the acoustic structure 1830 and/or the second acoustic structure 1870 may enter the third acoustic cavity 1883 through the third sound guiding tube 1881 and the fourth sound guiding tube 1882, respectively. The third acoustic structure 1880 may continue to adjust the first sub-band sound signal and the second sub-band sound signal to generate a third sub-band sound signal having a third resonance peak at the fourth resonance frequency. The first sub-band sound signal, the second sub-band sound signal, and the third sub-band sound signal generated by the acoustic structure 1830, the second acoustic structure 1870, and the third acoustic structure 1880 may be transmitted through the hole portion 1821 of the acoustoelectric transducer 1820 to the acoustoelectric transducer 1820. The acoustoelectric transducer 1820 may generate the electrical signal according to the first sub-band sound signal, the second sub-band sound signal, and the third sub-band sound signal.

Figure 19:
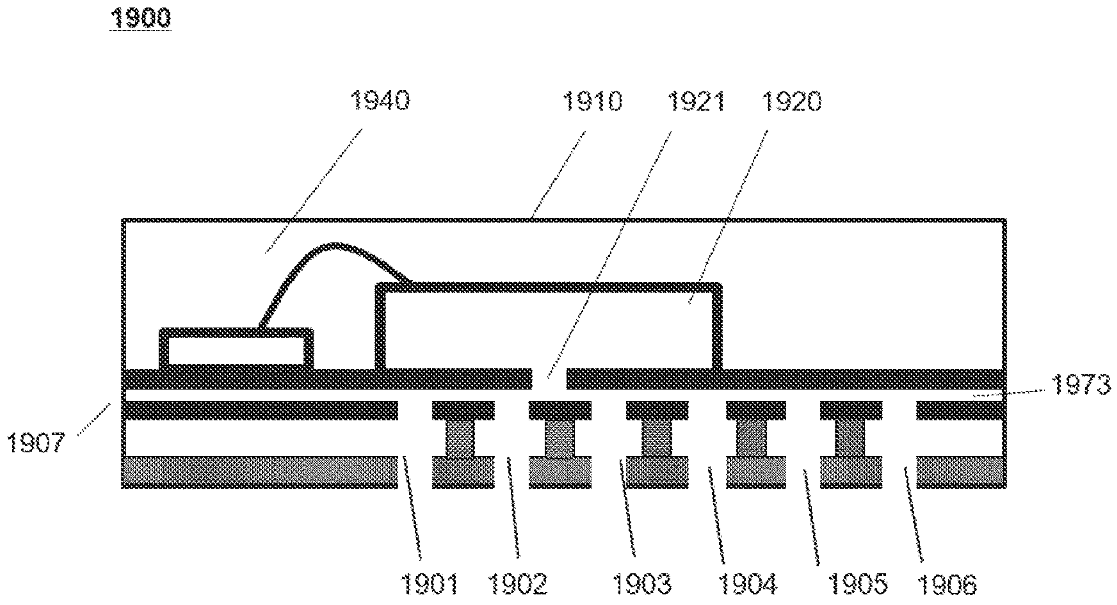
FIG. 19 is a schematic diagram illustrating an exemplary microphone according to some embodiments of the present disclosure.

It should be noted that the acoustic structures included in the microphone 1800 are not limited to the acoustic structure 1830, the second acoustic structure 1870, and the third acoustic structure 1880 shown in FIG. 18. The number of the acoustic structures included in the microphone 1800, the structural parameters of the acoustic structures, the connection manner of the acoustic structures, etc., may be set according to actual requirements (e.g., a target resonance frequency, a target sensitivity, a number of sub-band electrical signals, etc.). Merely by way of example, FIG. 19 is a schematic diagram illustrating an exemplary microphone according to some embodiments of the present disclosure. As shown in FIG. 19, the microphone 1900 may include a housing 1910, an acoustoelectric transducer 1920, an acoustic cavity 1940, an acoustic structure 1901, an acoustic structure 1902, an acoustic structure 1903, an acoustic structure 1904, an acoustic structure 1905, an acoustic structure 1906, and an acoustic structure 1907. The acoustoelectric transducer 1920 may be disposed in the acoustic cavity 1940. The acoustoelectric transducer 1920 may include a hole portion 1921. The acoustic structure 1907 may include an acoustic cavity 1973 and six sound guiding tubes communicating with the acoustic structure 1901, the acoustic structure 1902, the acoustic structure 1903, the acoustic structure 1904, the acoustic structure 1905, and the acoustic structure 1906, respectively. The components of the microphone 1900 and the processing process of the sound signal are similar to those of the microphone 1800 in FIG. 18, and are not repeated here.

Figure 20:
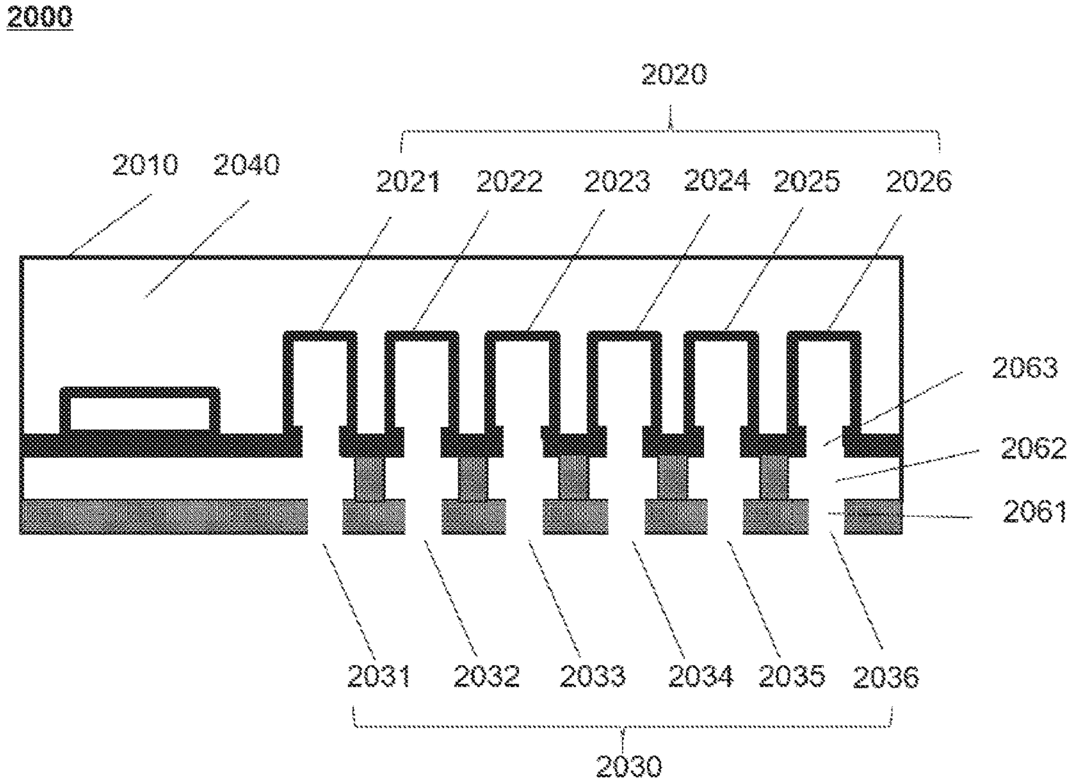
FIG. 20 is a schematic diagram illustrating an exemplary microphone according to some embodiments of the present disclosure.

FIG. 20 is a schematic diagram illustrating an exemplary microphone according to some embodiments of the present disclosure. As shown in FIG. 20, a microphone 2000 may include a housing 2010, an acoustic cavity 2040, an acoustoelectric transducer 2020, and an acoustic structure 2030. In some embodiments, the acoustoelectric transducer 2020 may be disposed in the acoustic cavity 2040. In some embodiments, the acoustoelectric transducer 2020 may include a plurality of acoustoelectric transducers, for example, an acoustoelectric transducer 2021, a second acoustoelectric transducer 2022, a third acoustoelectric transducer 2023, a fourth acoustoelectric transducer 2024, a fifth acoustoelectric transducer 2025, and a sixth acoustoelectric transducer 2026. In some embodiments, the acoustic structure 2030 may include a plurality of acoustic structures, for example, an acoustic structure 2031, a second acoustic structure 2032, a third acoustic structure 2033, a fourth acoustic structure 2034, a fifth acoustic structure 2035, and a sixth acoustic structure 2036. In some embodiments, each acoustic structure in the microphone 2000 is disposed corresponding to one acoustoelectric transducer. For example, the acoustic structure 2031 is in acoustic communication with the acoustoelectric transducer 2021 through the hole portion of the acoustoelectric transducer 2021, the second acoustic structure 2032 is in acoustic communication with the second acoustoelectric transducer 2022 through the hole portion of the second acoustoelectric transducer 2022, the third acoustic structure 2033 is in acoustic communication with the third acoustoelectric transducer 2023 through the hole portion of the third acoustoelectric transducer 2023, the fourth acoustic structure 2034 is in acoustic communication with the fourth acoustoelectric transducer 2024 through the hole portion of the fourth acoustoelectric transducer 2024, the fifth acoustic structure 2035 is in acoustic communication with the fifth acoustoelectric transducer 2025 through the hole portion of the fifth acoustoelectric transducer 2025, and the sixth acoustic structure 2036 is in acoustic communication with the sixth acoustoelectric transducer 2026 through the hole portion of the sixth acoustoelectric transducer 2026. Taking the sixth acoustic structure 2036 as an example for illustration, the sixth acoustic structure 2036 includes a sound guiding tube 2061 and an acoustic cavity 2062. The sixth acoustic structure 2036 is in acoustic communication with the outside of the microphone 2000 through the sound guiding tube 2061 for receiving a sound signal. The acoustic cavity 2062 of the sixth acoustic structure 2036 is in acoustic communication with the acoustoelectric transducer 2026 through the hole portion of the acoustoelectric transducer 2026. In some embodiments, all acoustic structures in the microphone may correspond to one acoustic transducer. For example, the sound guiding tubes of the acoustic structure 2031, the second acoustic structure 2032, the third acoustic structure 2033, the fourth acoustic structure 2034, the fifth acoustic structure 2035, and the sixth acoustic structure 2036 may be in acoustic communication with the outside of the microphone 2000, respectively, whose acoustic cavities may be in acoustic communication with the acoustic transducer. As another example, the microphone 2000 may include a plurality of acoustoelectric transducers, a part of the acoustic structure 2031, the second acoustic structure 2032, the third acoustic structure 2033, the fourth acoustic structure 2034, the fifth acoustic structure 2035, and the sixth acoustic structure 2036 may be in acoustic communication with one acoustoelectric transducer of the plurality of acoustic transducers, and another part of the acoustic structures may be in acoustic communication with the other acoustoelectric transducers. As a further example, the microphone 2000 may include a plurality of acoustoelectric transducers, and the acoustic cavity of the acoustic structure 2031 may be in acoustic communication with the acoustic cavity of the second acoustic structure 2032 through the sound guiding tube of the second acoustic structure 2032. The acoustic cavity of the second acoustic structure 2032 may be in acoustic communication with the acoustic cavity of the third acoustic structure 2033 through the sound guiding tube of the third acoustic structure 2033. The fourth acoustic structure 2034 may be in acoustic communication with the acoustic cavity of the fifth acoustic structure 2035 through the sound guiding tube of the fifth acoustic structure 2035. The acoustic cavity of the fifth acoustic structure 2035 may be in acoustic communication with the acoustic cavity of the sixth acoustic structure 2036 through the sound guiding tube 2061 of the sixth acoustic structure 2036. The acoustic cavity of the third acoustic structure 2033 and the acoustic cavity 2062 of the sixth acoustic structure 2036 may be in acoustic communication with the same or different acoustoelectric transducers. Such deformations are all within the protection scope of the present disclosure.

In some embodiments, each of the acoustic structures 2030 may adjust the received sound signal to generate a sub-band sound signal. The generated sub-band sound signals may be transmitted to an acoustoelectric transducer in acoustic communication with each acoustic structure. The acoustoelectric transducers convert the received sub-band sound signals to sub-band electrical signals. In some embodiments, the acoustic structures in the acoustic structure 2030 may have different resonance frequencies. In this case, the acoustic structures in the acoustic structure 2030 may generate sub-band sound signals with different resonance frequencies. After conversion by the acoustoelectric transducers corresponding to the acoustic structures, the sub-band electrical signals with different resonance frequencies may be generated. In some embodiments, the count of the acoustic structures 2030 and/or the acoustoelectric transducers 2020 may be set according to actual conditions. For example, the count of acoustic structures 2030 and/or the acoustoelectric transducers 2020 may be set according to the count of the sub-band sound signals and/or the sub-band electrical signals to be generated. Merely by way of example, when the count of the sub-band electrical signals to be generated is 6, as shown in FIG. 20, 6 acoustic structures may be set, and the microphone 2000 may output 6 sub-band electrical signals, whose resonance frequencies are in the range of 500 Hz-700 Hz, 1000 Hz-1300 Hz, 1700 Hz-2200 Hz, 3000 Hz-3800 Hz, 4700 Hz-5700 Hz, 7000 Hz-12000 Hz, respectively. As another example, the resonance frequencies of the 6 sub-band electrical signals output by the microphone 2000 may be in the range of 500 Hz-640 Hz, 640 Hz-780 Hz, 780 Hz-930 Hz, 940 Hz-1100 Hz, 1100 Hz-1300 Hz, and 1300 Hz-1500 Hz, respectively. As a further example, the resonance frequencies of the 6 sub-band electrical signals output by the microphone 2000 may be in the range of 20 Hz-120 Hz, 120 Hz-210 Hz, 210 Hz-320 Hz, 320 Hz-410 Hz, 410 Hz-500 Hz, and 500 Hz-640 Hz, respectively.

In some embodiments, by disposing one or more acoustic structures in the microphone, for example, the acoustic structure 1730 and the acoustic structure 1770 in the microphone 1700, the acoustic structure 1830, the acoustic structure 1870, and the acoustic structure 1880 in the microphone 1800, the acoustic structure 1901, the acoustic structure 1902, the acoustic structure 1903, the acoustic structure 1904, the acoustic structure 1905, and the acoustic structure 1906 in the microphone 1900, the resonance frequency of the microphone may be increased, thereby improving the sensitivity of the microphone in a relatively wide frequency range. In addition, by disposing the connection manners of multiple acoustic structures and/or acoustoelectric transducers, for example, each acoustic structure corresponds to one acoustoelectric transducer shown in the microphone 2000 in FIG. 20, the sensitivity of the microphone 2000 in a relatively wide frequency range may be improved, and the sub-band electric signals may be generated by dividing the frequencies of the sound signal, thereby reducing the burden of subsequent hardware processing.

Figure 21:
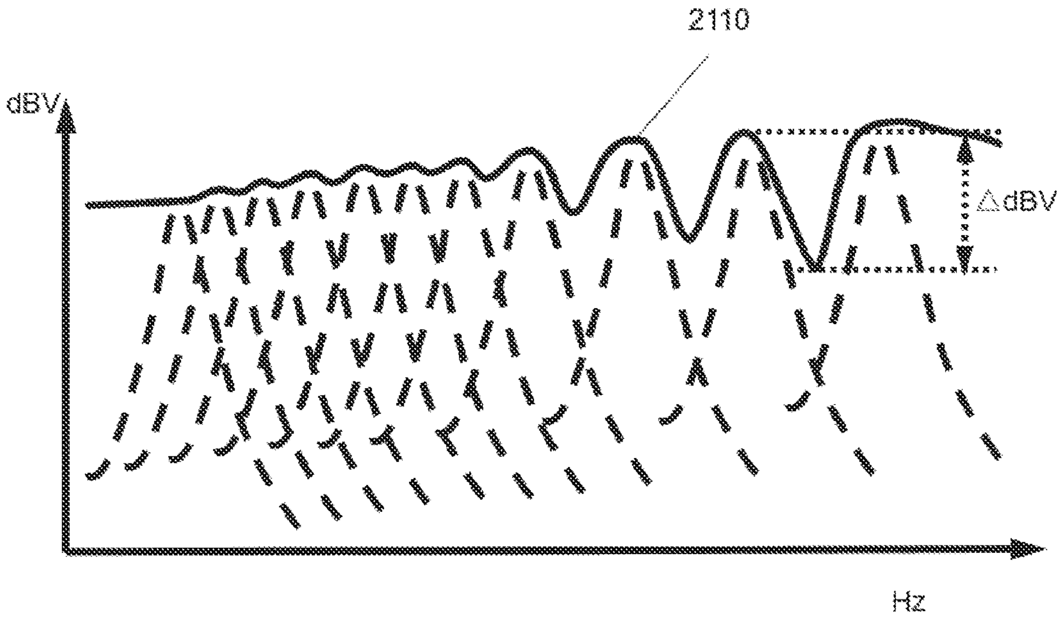
FIG. 21 is a schematic diagram illustrating a frequency response curve of an exemplary microphone according to some embodiments of the present disclosure.
Figure 22:
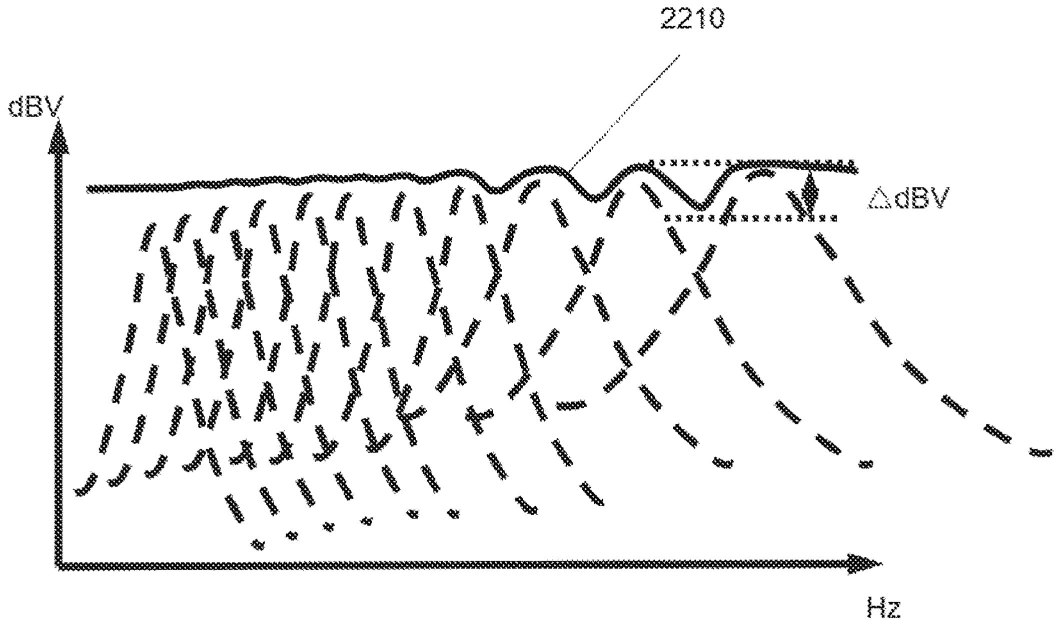
FIG. 22 is a schematic diagram illustrating a frequency response curve of an exemplary microphone according to some embodiments of the present disclosure.

FIG. 21 is a schematic diagram illustrating a frequency response curve of an exemplary microphone according to some embodiments of the present disclosure. As shown in FIG. 21, the horizontal axis represents the frequency, in Hz, and the vertical axis represents the frequency response of the microphone, in dBV. Taking the microphone including 11 acoustic structures as an example, the 11 dotted lines in FIG. 21 represent the frequency response curves of the 11 acoustic structures. In some embodiments, the frequency response curves of the 11 acoustic structures may cover the frequency range (i.e., 20 Hz-20 kHz) of audible to the human ear. The solid line in FIG. 21 represents a frequency response curve 2110 of the microphone. For ease of understanding, the frequency response curve 2110 of the microphone may be regarded as obtained by fusing the frequency response curves of 11 acoustic structures. In some embodiments, the adjustment of the target frequency response curve of the microphone may be achieved by adjusting the frequency response curves of one or more acoustic structures. For example, since the fundamental frequency of the human voice is basically concentrated between about 100 Hz-300 Hz, and most voice information is also concentrated in the middle and low frequency band, under a condition that a communication effect after the sub-band acoustic signal processing is not reduced, the count of high frequency sub-band acoustic signals may be reduced (that is, reducing the count of acoustic structures whose resonance frequencies are in the high frequency band). As another example, at the intersection of frequency response curves (e.g., two adjacent frequency response curves) of two or more acoustic structures, the frequency response curve of the microphone generated by fusion may have pits. A pit may be understood as a frequency response difference (e.g., AdBV shown in FIG. 21) between adjacent peak and trough in the fused frequency response curve (e.g., the curve 2110). The generation of the pits may cause large fluctuations in the frequency response of the microphone, thereby affecting the sensitivity and/or Q value of the microphone. In some embodiments, the resonance frequency of the acoustic structure may be reduced by adjusting the structural parameters of the acoustic structure, for example, reducing the cross-sectional area of the sound guiding tube, increasing the length of the sound guiding tube, and increasing the volume of the acoustic cavity. In some embodiments, by adjusting the structural parameters of the acoustic structure, for example, setting an acoustic resistance structure in the microphone, etc., the frequency bandwidth of the frequency response curve of the acoustic structure may be increased to reduce the larger pits in the frequency range of the frequency response curve 2110 after fusion, thereby improving the performance of the microphone. For example, FIG. 22 is a schematic diagram illustrating a frequency response curve of an exemplary microphone according to some embodiments of the present disclosure. As shown in FIG. 22, the horizontal axis represents the frequency, in Hz, and the vertical axis represents the frequency response of the microphone, in dBV. Each dotted line may represent one of the frequency response curves of the 11 acoustic structures of the microphone, respectively. Compared with the 11 acoustic structures corresponding to the 11 dashed lines in FIG. 21, the 11 acoustic structures corresponding to the 11 dashed lines in FIG. 22 may have a higher acoustic resistance. For example, the inner surfaces of the side walls of the sound guiding tubes of the 11 acoustic structures corresponding to the 11 dashed lines in FIG. 22 are relatively rough, the sound guiding tubes or acoustic cavities are disposed with acoustic resistance structures, and the sound guiding tubes have relatively small sizes, and the like. Compared to the frequency response curve 2110 of the acoustic structure in FIG. 21, the response curve 2210 of the acoustic structure shown in FIG. 22 (especially the response curve of relatively high frequencies) has a relatively wider frequency bandwidth. The frequency response curve of the microphone fused from the frequency response curves of the 11 acoustic structures has relatively small pits (e.g., AdBV shown in FIG. 22), and the fused frequency response curve 2210 is flatter.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially" and etc. Unless otherwise stated, "about," "approximate," or "substantially" may indicate ±20% variation of the value it describes. Accordingly, in some embodiments, the numerical data set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and data configured to illustrate the broad scope of some embodiments of the present disclosure are approximations, the numerical values in specific examples may be as accurate as possible within a practical scope.

What is claimed is:

1. A microphone, comprising:

at least one acoustoelectric transducer configured to convert a sound signal to an electrical signal; and an acoustic structure including a sound guiding tube and an acoustic cavity, the acoustic cavity being in acoustic communication with the at least one acoustoelectric transducer, wherein, the acoustic structure has a first resonance frequency, the at least one acoustoelectric transducer has a second resonance frequency, and an absolute value of a difference between the first resonance frequency and the second resonance frequency is not less than 100 Hz, wherein the microphone further includes a second acoustic structure including a second sound guiding tube and a second acoustic cavity, the acoustic cavity is in acoustic communication with the second acoustic cavity through the sound guiding tube, the second acoustic cavity is in acoustic communication with the outside of the microphone through the second sound guiding tube, the second acoustic structure has a third resonance frequency that is different from the first resonance frequency, and a difference between the first resonance frequency and the third resonance frequency is less than 100 Hz.

2. The microphone of claim 1, wherein a sensitivity of response of the microphone at the first resonance frequency is greater than a sensitivity of response of the at least one acoustoelectric transducer at the first resonance frequency.

3. The microphone of claim 1, wherein the first resonance frequency is related to one or more structural parameters of the acoustic structure, and the one or more structural parameters of the acoustic structure include at least one of a shape of the sound guiding tube, a size of the sound guiding tube, a size of the acoustic cavity, an acoustic resistance of the sound guiding tube or the acoustic cavity, or a roughness of an inner surface of a side wall forming the sound guiding tube.

4. The microphone of claim 1, further comprising:

a housing, wherein the at least one acoustoelectric transducer and the acoustic cavity are located within the housing, and the housing includes a first side wall for forming the acoustic cavity.

5. The microphone of claim 4, wherein a first end of the sound guiding tube is located on the first side wall, and a second end of the sound guiding tube is away from the first side wall and is located outside the housing.

6. The microphone of claim 4, wherein a first end of the sound guiding tube is located on the first side wall, and a second end of the sound guiding tube is away from the first side wall and extends into the acoustic cavity.

7. The microphone of claim 4, wherein a first end of the sound guiding tube is away from the first side wall and is located outside the housing, and a second end of the sound guiding tube extends into the acoustic cavity.

8. The microphone of claim 1, wherein an acoustic resistance structure is disposed in the sound guiding tube or the acoustic cavity, and the acoustic resistance structure is configured to adjust a frequency bandwidth of the acoustic structure.

9. The microphone of claim 8, wherein an acoustic resistance value of the acoustic resistance structure is in a range from 1 MKS Rayls to 100 MKS Rayls.

10. The microphone of claim 8, wherein a thickness of the acoustic resistance structure is in a range from 20 μm to 300 μm, an aperture size of the acoustic resistance structure is in a range from 20 μm to 300 μm, and/or a porosity of the acoustic resistance structure is in a range from 30% to 50%.

11. The microphone of claim 8, wherein the acoustic resistance structure is disposed at one or more of positions including: an outer surface of a side wall forming the sound guiding tube and away from a first side wall, a position inside the sound guiding tube, an inner surface of the first side wall, a position inside the acoustic cavity, an inner surface of a second side wall forming a hole portion of the at least one acoustoelectric transducer, an outer surface of the second side wall, a position inside the hole portion of the at least one acoustoelectric transducer.

12. The microphone of claim 1, wherein an aperture size of the sound guiding tube is not greater than twice a length of the sound guiding tube, the aperture size of the sound guiding tube is in a range from 0.1 mm to 10 mm, and the length of the sound guiding tube is in a range from 1 mm to 8 mm.

13. The microphone of claim 1, wherein an inner diameter of the acoustic cavity is not less than a thickness of the acoustic cavity, the inner diameter of the acoustic cavity is in a range from 1 mm to 20 mm, and a thickness of the acoustic cavity is in a range from 1 mm to 20 mm.

14. The microphone of claim 1, wherein:

when the third resonance frequency is greater than the first resonance frequency, a difference between a sensitivity of response of the microphone at the third resonance frequency and a sensitivity of response of the at least one acoustoelectric transducer at the third resonance frequency is greater than a difference between a sensitivity of response of the microphone at the first resonance frequency and a sensitivity of response of the at least one acoustoelectric transducer at the first resonance frequency.

15. The microphone of claim 1, wherein the second acoustic cavity is in acoustic communication with the acoustic cavity through the sound guiding tube.

16. The microphone of claim 1, wherein the at least one acoustoelectric transducer further includes a second acoustoelectric transducer, the second acoustic cavity being in acoustic communication with the second acoustoelectric transducer.

17. A microphone, comprising:

at least one acoustoelectric transducer configured to convert a sound signal to an electrical signal; and an acoustic structure including a sound guiding tube and an acoustic cavity, the acoustic cavity being in acoustic communication with an outside of the microphone through the sound guiding tube;

a second acoustic structure including a second sound guiding tube and a second acoustic cavity, the second acoustic cavity being in acoustic communication with the outside of the microphone through the second sound guiding tube; and a third acoustic structure including a third sound guiding tube, a fourth sound guiding tube, and a third acoustic cavity, wherein:

the acoustic cavity is in acoustic communication with the third acoustic cavity through the third sound guiding tube, the second acoustic cavity is in acoustic communication with the third acoustic cavity through the fourth sound guiding tube, the third acoustic cavity is in acoustic communication with the at least one acoustoelectric transducer, and the acoustic structure has a first resonance frequency, the at least one acoustoelectric transducer has a second resonance frequency, and an absolute value of a difference between the first resonance frequency and the second resonance frequency is not less than 100 Hz; the second acoustic structure has a third resonance frequency that is different from the first resonance frequency, the third acoustic structure has a fourth resonance frequency that is different from the third resonance frequency and the first resonance frequency.

18. The microphone of claim 1, wherein the at least one acoustoelectric transducer includes a hole portion, and the acoustic structure is acoustically connected to the acoustoelectric transducer through the hole portion.

* * * * *